(12) United States Patent
Kogo et al.

(10) Patent No.: US 8,936,123 B2
(45) Date of Patent: Jan. 20, 2015

(54) VEHICLE

(75) Inventors: Satoshi Kogo, Wako (JP); Eiji Toriyama, Wako (JP); Kenji Morita, Wako (JP); Gen Tanabe, Wako (JP); Toru Ukawa, Wako (JP); Hajime Soda, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 459 days.

(21) Appl. No.: 13/057,965

(22) PCT Filed: May 13, 2009

(86) PCT No.: PCT/JP2009/058929
§ 371 (c)(1),
(2), (4) Date: Feb. 7, 2011

(87) PCT Pub. No.: WO2010/016310
PCT Pub. Date: Feb. 11, 2010

(65) Prior Publication Data
US 2011/0155493 A1    Jun. 30, 2011

(30) Foreign Application Priority Data

Aug. 8, 2008   (JP) ................................. 2008-206253
Aug. 12, 2008  (JP) ................................. 2008-208074
Aug. 12, 2008  (JP) ................................. 2008-208089

(51) Int. Cl.
*B62K 11/00*  (2006.01)
*B62H 1/02*   (2006.01)
(Continued)

(52) U.S. Cl.
CPC ............... *B62H 1/02* (2013.01); *B60Q 1/0433* (2013.01); *B62J 6/02* (2013.01); *B62J 17/02* (2013.01);
(Continued)

(58) Field of Classification Search
CPC ............ B62J 17/00; B62J 17/02; B62J 17/04; B62J 17/06; F02M 35/162; F02M 35/10013; F02M 35/10262; B62K 11/00; B60K 11/08; B60K 37/00; B60K 13/02; B60K 13/16; F01P 2050/16
USPC ................ 180/68.1, 68.2, 68.3, 218, 219, 90; 296/72, 78.1, 208
See application file for complete search history.

(56) References Cited

U.S. PATENT DOCUMENTS 4,678,223 A * 7/1987 Kishi et al. .................... 296/78.1
4,709,774 A * 12/1987 Saito et al. .................... 180/229
(Continued)

FOREIGN PATENT DOCUMENTS

JP    1-94083 A    4/1989
JP    1-233182 A   9/1989
(Continued)

*Primary Examiner* — J. Allen Shriver, III
*Assistant Examiner* — Emma K Frick
(74) *Attorney, Agent, or Firm* — Birch, Stewart, Kolasch & Birch, LLP

(57) ABSTRACT

A vehicle comprising a vehicle body frame (11), a front cowl (72) provided in front of the vehicle body frame, and a headlight unit (59) mounted within the width, in the vehicle's lateral direction, of the front cowl. The headlight unit has, on the opposite sides thereof, recesses (115L, 115R) recessed inward in the vehicle's lateral direction. Air intake openings (111L, 111R) for introducing air in front of the front cowl into the inner side of the front cowl are formed between the headlight unit and the front cowl.

6 Claims, 29 Drawing Sheets

(51) Int. Cl.

| | | |
|---|---|---|
| *B60Q 1/04* | (2006.01) | |
| *B62J 6/02* | (2006.01) | |
| *B62J 17/02* | (2006.01) | |
| *B62J 17/06* | (2006.01) | |
| *B62J 25/00* | (2006.01) | |
| *B62J 99/00* | (2009.01) | |
| *B62K 11/04* | (2006.01) | |
| *F02M 35/10* | (2006.01) | |
| *F02M 35/16* | (2006.01) | |

(52) U.S. Cl.
CPC ...... *B62J 17/06* (2013.01); *B62J 25/00* (2013.01); *B62J 99/00* (2013.01); *B62K 11/04* (2013.01); *F02M 35/10124* (2013.01); *F02M 35/162* (2013.01)
USPC ......... 180/68.3; 180/68.1; 180/219; 180/229; 296/78.1; 296/208

(56) References Cited

U.S. PATENT DOCUMENTS

| | | | | |
|---|---|---|---|---|
| 4,830,135 A | * | 5/1989 | Yamashita | 180/229 |
| 4,913,256 A | * | 4/1990 | Sakuma | 180/229 |
| 4,964,484 A | * | 10/1990 | Buell | 180/219 |
| 6,276,482 B1 | * | 8/2001 | Moriya et al. | 180/229 |
| 6,484,836 B2 | * | 11/2002 | Tsuji | 180/90 |
| 7,387,180 B2 | * | 6/2008 | Konno et al. | 180/68.3 |
| 7,399,029 B2 | * | 7/2008 | Takeshita | 296/203.01 |
| 7,556,115 B2 | * | 7/2009 | Iwanaga | 180/229 |
| 7,658,253 B2 | * | 2/2010 | Shimizu | 180/219 |
| 2004/0079561 A1 | | 4/2004 | Ozawa et al. | |
| 2005/0205068 A1 | * | 9/2005 | Kurayoshi et al. | 123/472 |
| 2007/0096893 A1 | | 5/2007 | Kondo | |
| 2007/0120412 A1 | | 5/2007 | Koyano et al. | |

FOREIGN PATENT DOCUMENTS

| | | |
|---|---|---|
| JP | 4-43179 A | 2/1992 |
| JP | 5-46686 U | 6/1993 |
| JP | 7-156848 A | 6/1995 |
| JP | 8-230740 A | 9/1996 |
| JP | 10-305792 A | 11/1998 |
| JP | 2002-37170 A | 2/2002 |
| JP | 2002-284066 A | 10/2002 |
| JP | 2003-160074 A | 6/2003 |
| JP | 2004-67079 A | 3/2004 |
| JP | 2005-119391 A | 5/2005 |
| JP | 2007-62618 A | 3/2007 |
| JP | 2007-125901 A | 7/2007 |
| JP | 2007-175482 A | 7/2007 |
| JP | 2007-176369 A | 7/2007 |

* cited by examiner

VEHICLE

TECHNICAL FIELD

The present invention relates to vehicles in which air intake openings for introducing air from the front of a front cowl to inside the front cowl are provided to the left and right, as viewed in a vehicle width direction, of a headlight unit of the front cowl.

BACKGROUND ART

Japanese Utility Model Application Laid-Open Publication No. HEI-05-46686, for example, discloses a vehicle in which air intake openings for introducing air from the front of a front cowl to inside the front cowl are provided to the left and right, as viewed in a vehicle width direction, of a headlight unit of the front cowl. Namely, as viewed from the front of the vehicle, the air intake openings are provided to the left and right, respectively, of the headlight unit of a trapezoidal shape. The headlight unit is required to have a predetermined light emitting area. If the headlight unit having a predetermined light emitting area and the left and right air intake openings are arranged in the vehicle width direction, the front cowl would inevitably become great in size.

However, depending on the type of the vehicle, there is a need to reduce the size of the front cowl, i.e. the vehicle width.

PRIOR ART LITERATURE

Patent Literature 1: Japanese Utility Model Application Laid-Open Publication No. HEI-05-46686

SUMMARY OF INVENTION

Technical Problem

It is therefore an object of the present invention to provide a technique which can reduce the width of a vehicle, including air intake openings provided to the left and right of the headlight unit, while securing a necessary light emitting area of the headlight unit.

Solution to Problem

According to the present invention, as defined in claim 1, there is provided a vehicle comprising: a vehicle body frame; a front cowl provided in front of the vehicle body frame; and a headlight unit provided within a width, in a vehicle width direction, of the front cowl, the headlight unit having, in opposite sides thereof, recessed portions concaved inwardly in the vehicle width direction, the vehicle further having air intake openings formed between the headlight unit and the front cowl for introducing air from the front of the front cowl to inside the front cowl.

In a preferred implementation, as defined in claim 2, the vehicle of the invention further comprises: middle cowls provided outside and along opposite side portions of the vehicle body frame for covering opposite side portions of the vehicle; inner cowls provided inside the middle cowls and extending rearward for covering opposite side portions of the headlight unit; wind directing passages each provided between one of the middle cowls and one of the inner cowls for directing wind introduced through the air intake openings; an air cleaner provided behind the wind directing passages; air intake ducts extending forward from the air cleaner and having respective inlets facing corresponding outlets of the wind directing passages in such a manner that part of the wind flowing in the wind directing passages can be directed through the air intake ducts to the air cleaner.

In a preferred implementation, as defined in claim 3, the vehicle further has openings provided behind the wind directing passages for directing part of the wind to legs of a driver of the vehicle.

In a preferred implementation, as defined in claim 4, the vehicle further comprises: knee covers provided behind the openings for being sandwiched between the legs of the driver; and knee cover air inlets provided in front of the knee covers for introducing part of the travel wind to inside the knee covers.

Advantageous Effects of Invention

According to the present invention, as defined in claim 1, the headlight unit has, in its opposite sides, the recessed portions concaved inwardly in the vehicle width direction. Because the recessed portions are formed locally, reduction in the light emitting area of the headlight unit can be minimized.

The reduction in the light emitting area can be compensated for by merely the height and width of the headlight unit being slightly increased. Thus, even where the headlight unit has, in its opposite sides, the recessed portions concaved inwardly in the vehicle width direction, the necessary light emitting area can be secured.

Further, the air intake openings are provided in the recessed portions. Because the air intake openings are provided in the recessed portions, the length, in the vehicle width direction, over which the headlight unit and the left and right air intake openings are arranged, can be reduced sufficiently. As a result, the front cowl can be reduced in its dimension in the vehicle with direction, which can thereby reduce the overall size of the vehicle.

Furthermore, because the air intake openings are provided in the recessed portions, the air intake openings can have an increased area, the present invention can increase an amount of air introduced to inside the front cowl.

In one preferred implementation, as defined in claim 2, the inner cowls are provided inside the middle cowls, the wind directing passages are each provided between one of the middle cowls and one of the inner cowls, the air cleaner is provided behind the wind directing passages, and the air intake ducts, extending forward from the air cleaner, have their respective inlets facing the corresponding outlets of the wind directing passages.

The air intake ducts only have to extend forward from the air cleaner to the corresponding wind directing passages. Namely, there is no need for the air intake ducts of the air cleaner to extend over a long distance. Thus, it is possible to reduce the length of the air intake ducts.

Further, because the wind directing passages are formed using the middle cowls and inner cowls, the wind directing passages need not be constructed of separate ducts, so that the present invention can reduce the number of necessary component parts.

With still another preferred implementation, as defined in claim 3, the openings provided behind the wind directing passages allow part of the wind to be directed to the driver's legs. Namely, because the part of introduced wind contacts the driver's legs through the openings, the introduced wind can be used with an increased efficiency.

In still another preferred implementation, as defined in claim 4, part of the wind can be directed to inside the knee covers through the knee cover air inlets. Thus, in a case where a heat generating component like an electric component is provided inside the knee covers, the heat generating component can be cooled by the part of the wind, and thus, the travel wind can be used with an even further enhanced efficiency.

DESCRIPTION OF EMBODIMENTS

Figure 1:
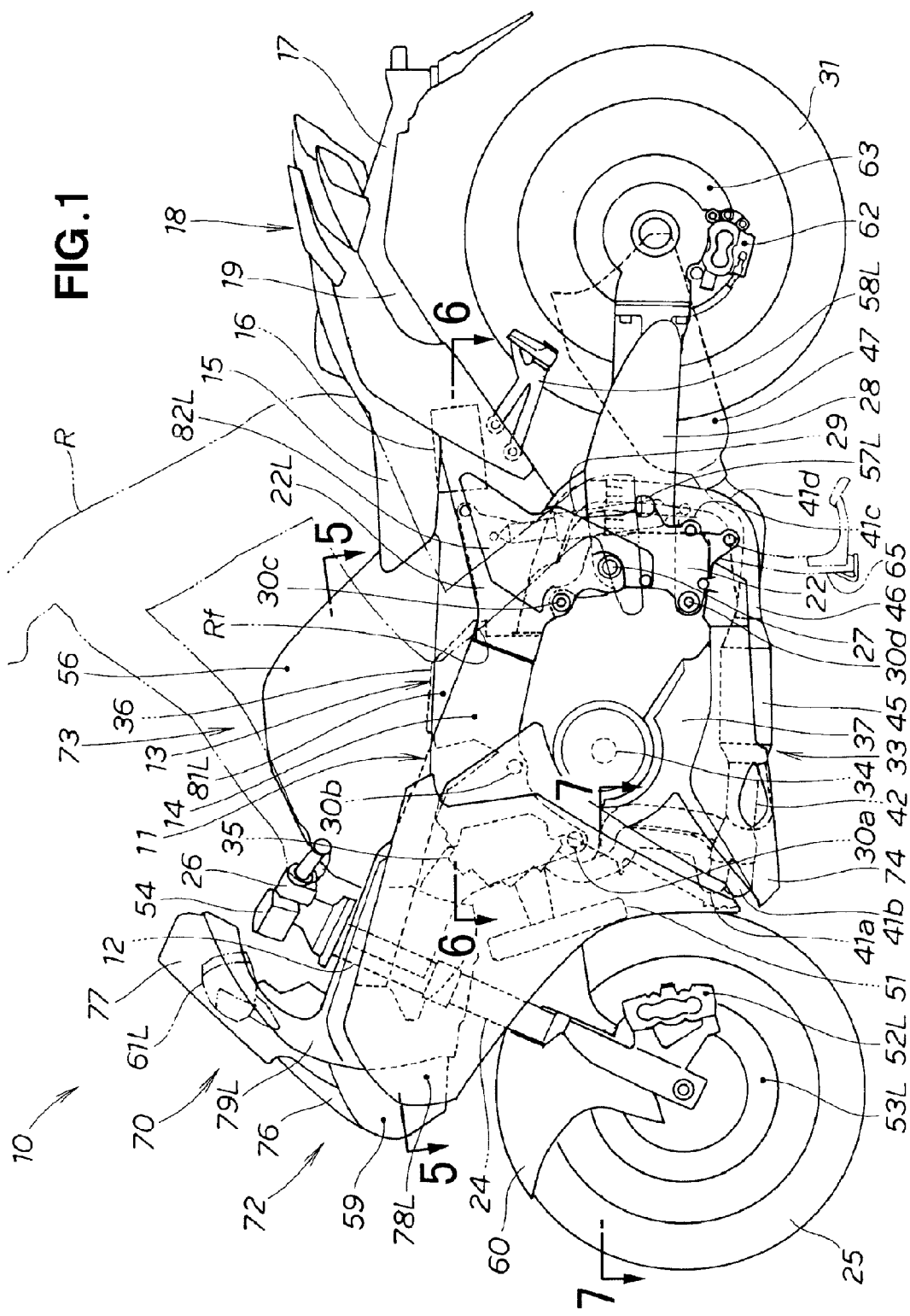
FIG. 1 is a left side view of a vehicle of the present invention.

In the following description, the terms "front", "rear", "left" and "right" are used to refer to directions as viewed from a driver, and "L" is a suffix attached to a reference numeral to indicate a component or element provided on a left side of a vehicle while "R" is a suffix attached to a reference numeral to indicate a component or element provided on a right side of the vehicle.

EXAMPLES

As shown in FIG. 1, an automotive two-wheeled vehicle 10, which is an embodiment of the vehicle of the present invention, includes a vehicle body frame 11 as its main component.

The vehicle body frame 11 includes: a head pipe 12; a main frame 14 extending rearward from the head pipe 12 and supporting an engine 13; a rear frame 19 extending obliquely rearward and upward from the main frame 14 to support a driver's seat 15 and electric components, such as a battery 16, but also a rear vehicle body section 18 including a rear fender 17; and pivot plates 22 extending downward from the main frame 14 to support a swing arm 28.

A pivot shaft 27 is fitted in the pivot plates 22. The swing arm 28 extends rearward from the pivot shaft 27. A shock-absorbing rear cushion unit 29 is disposed between the vehicle body frame 11 and the swing arm 28. A rear wheel 31 is mounted to a distal end portion of the swing arm 28. The rear wheel 31 is driven by the engine 13 via a drive shaft.

A front fork 24 is provided on the head pipe 12, a front wheel 25 is attached to a lower end portion of the front fork 24, and a steering handle 26 for steering the front wheel 25 is attached to an upper end portion of the front fork 24.

The engine 13 is a V-type four-cylinder engine, which is supported by the main frame 14 via first to fourth support sections 30a to 30d. The first to fourth support sections 30a to 30d each extend horizontally in a width direction of the vehicle and are arranged in the mentioned order in a front-to-rear direction of the vehicle. Of the support sections 30a to 30d, the third and fourth support sections 30c and 30d are fixed to the pivot plates 22. Namely, the engine 13 is fixedly supported by the main frame 14 and pivot plates 22.

The V-type four-cylinder engine 13 has a crankcase 37, front cylinders 35 extending obliquely forward and upward from a crankshaft 34 provided within the crankcase 37, and rear cylinders 36 extending obliquely rearward and upward from the crankshaft 34.

As viewed from a lateral side of the vehicle, the main frame 14 overlaps the front and rear cylinders 35 and 36, and part of the pivot plates 22 overlaps the crankcase 37.

An exhaust device 33 for discharging exhaust gas from the V-type four-cylinder engine 13 includes: exhaust pipes 41a to 41d extending from the respective cylinders 35 and 36; a catalyst tube 45 into which the exhaust pipes 41a to 41d merge and which purifies exhaust gas from the exhaust pipes 41a to 41d; a collecting pipe 46 extending from the catalyst tube 45; and a silencer 47 connected to the collecting pipe 46.

A radiator unit 51 for cooling the engine 13 is provided in front of the engine 13, a front disk brake caliper 52L is provided beneath the front fork 24, and a front disk plate 53L to be braked by the front disk brake caliper 52L is provided on the front wheel 25. A front fender 60 covering an upper portion of the front wheel 25 is provided on a lower portion of the front fork 24. A front master cylinder 54 is provided on the steering handle 26.

A fuel tank cover 56 is provided on a middle upper portion of the main frame 14, and a fuel tank is provided within the fuel tank cover 56.

A driver's step 57L for supporting a driver's foot is provided on the pivot plate 22 extending downward from a rear portion of the main frame 14.

Further, a pillion passenger's step 58L for supporting a pillion passenger's foot is fixed to the rear frame 19, and a main stand 65 indicated by imaginary line is fixed to the lower end of the pivot plate 22.

Although not particularly described above, similar elements which are suffixed with "R" are provided generally in symmetrical relation to the above-described elements suffixed with "L". The same can be said for the following description as well.

A rear disk brake caliper 62 is mounted to a rear portion of the swing arm 28 near the rear wheel 31, and a rear disk plate 63 to be braked by the rear disk brake caliper 62 is mounted on the rear wheel 31.

The following describe a cowl unit 70 that is an outer appearance member of the automotive two-wheeled vehicle 10.

The cowl unit 70 includes a front cowl 72 extending from the head pipe 12, supported by a cowl stay 71 (FIG. 4) and covering a front portion of the vehicle body frame 11, a side cowl 73 provided continuously with the front cowl portion 72 to cover side portions of the vehicle, and a lower cowl 74 provided beneath the engine 13. The cowl unit 70 functions as a wind guard and also functions to enhance the outer appearance of the vehicle.

The front cowl 72 includes: an upper center cowl 76 covering an upper portion of a headlight unit 59; a wind screen 77 extending above the upper center cowl 76; and part of a front upper side cowl 79L to which is mounted a middle cowl 78L covering a side portion of the main frame 14 and which supports the wind screen 77.

The side cow section 73 includes: the front upper side cowl 79L supporting the wind screen 77; the middle cowl 78L covering side portions of the head pipe 12 and main frame 14; a knee cover 81L covering a lower portion of the fuel tank cover 56 and designed to be sandwiched by legs Rf of the driver R; and a pivot plate cover 82L provided below the knee cover 81L and covering the outer side surface of the pivot plate 22L.

Figure 2:
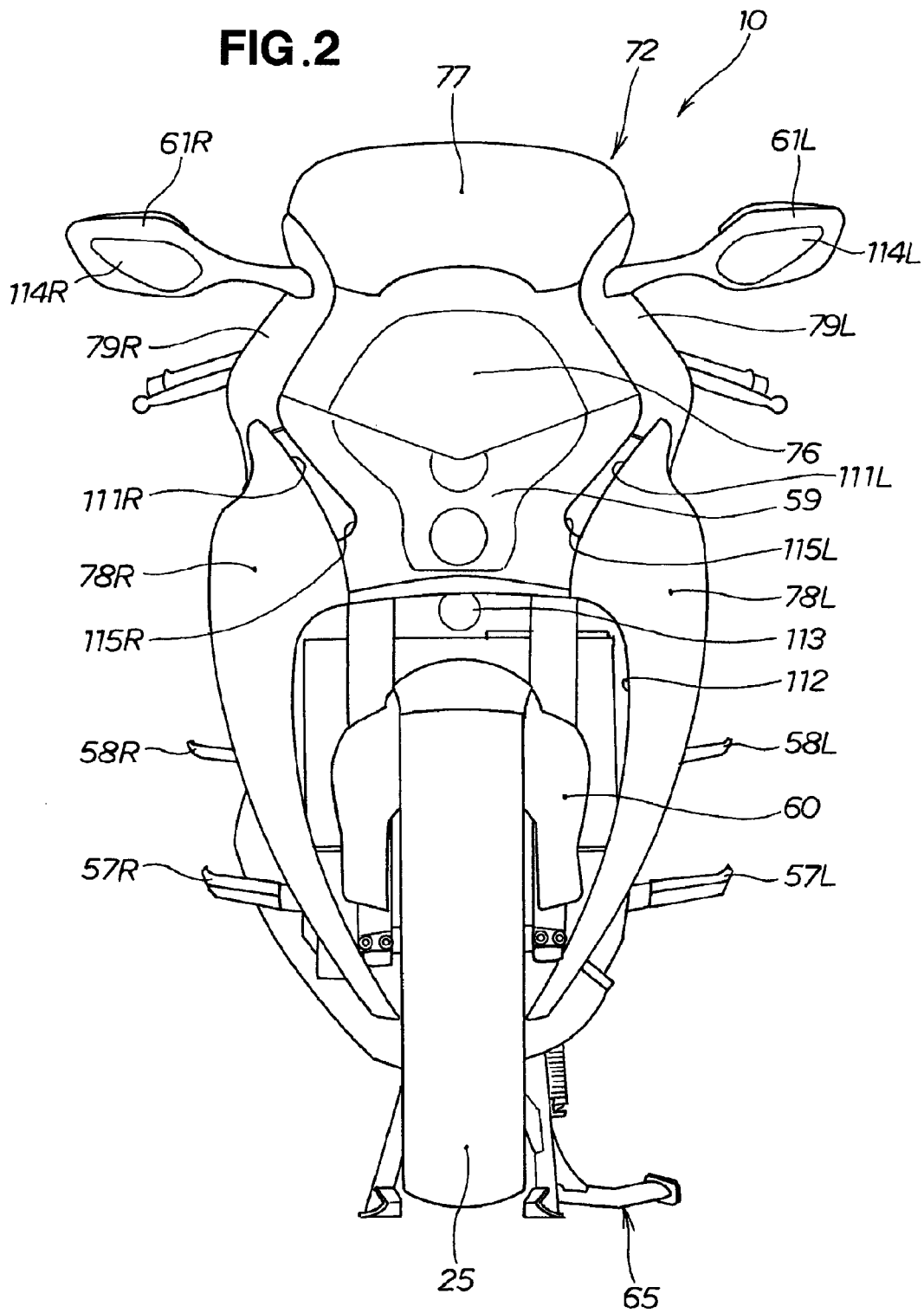
FIG. 2 is a front view of the vehicle of the present invention.

As shown in a front view of FIG. 2, the automotive two-wheeled vehicle 10 includes: the headlight unit 59; the upper center cowl 76 covering an upper portion of the headlight unit 59; the wind screen 77 extending above the upper center cowl 76 to overlap the upper center cowl 76; the front upper side cowls 79L and 79R supporting the wind screen 77 and having left and right rearview mirrors 61L and 61R mounted thereto; the middle cowls 78L and 78R covering lower portions of the front upper side cowls 79L and 79R and extending to behind the headlight unit 59; air intake openings 111L and 111R formed between the headlight unit 59 and the middle cowls 78L and 78R to introduce travel wind (i.e., wind encountered as the vehicle travels) to inside the front cowl 72; and a radiator air intake opening 112 formed in a region surrounded by a lower end portion of the headlight unit 59 and front end portions of the left and right middle cowls 78L and 78R.

Namely, the automotive two-wheeled vehicle 10 includes, in its front area, the front cowl 72, the headlight unit 59 disposed within the width of the front cowl 72, and the intake openings 111L and 111R located to the opposite sides of the headlight unit 59.

An alarming horn 113 is provided behind the radiator air intake opening 112. Further, blinkers 114L and 114R are fixed integrally to the left and right mirrors 61L and 61R.

Figure 3:
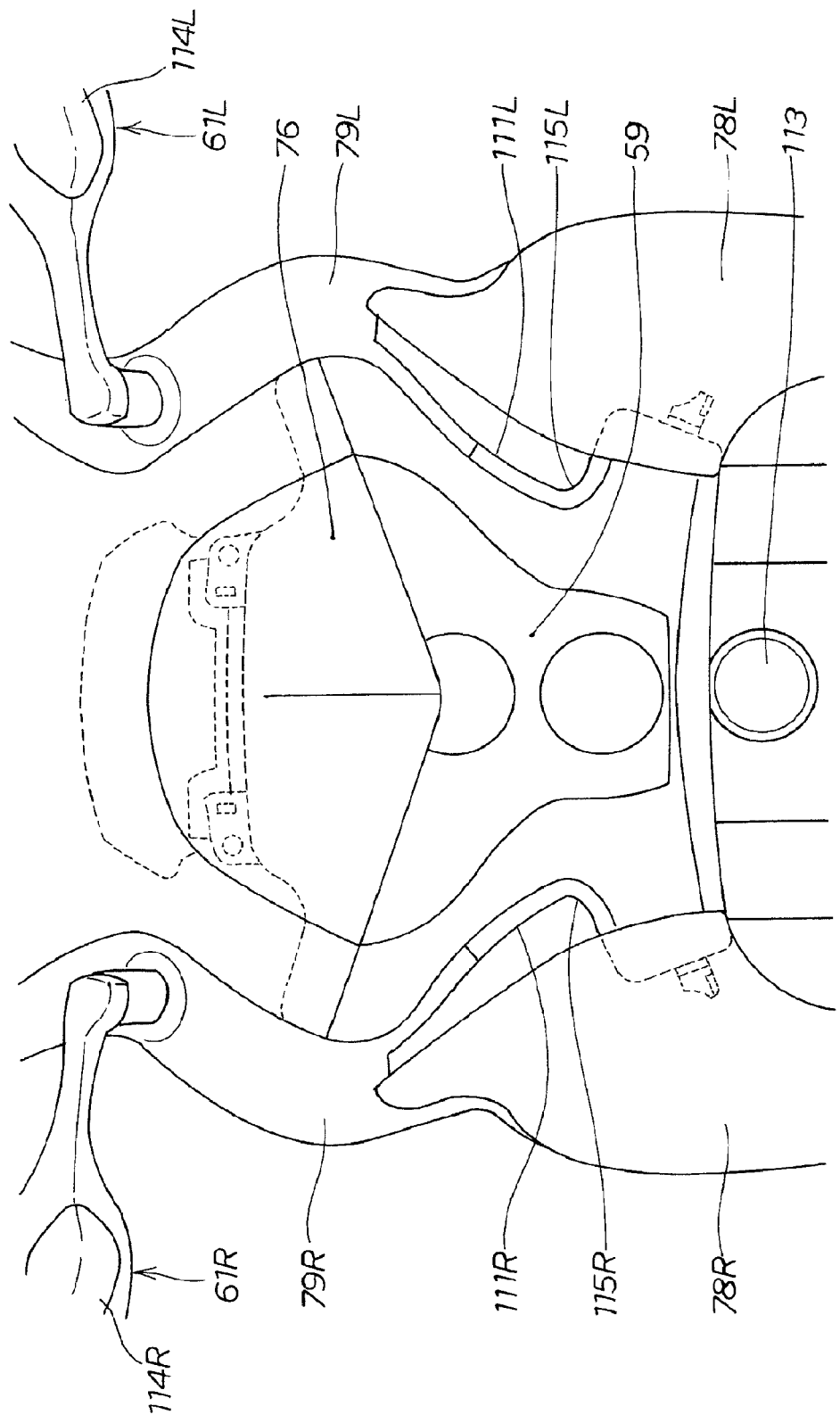
FIG. 3 is an enlarged view showing primary components of FIG. 2.

As shown in FIG. 3 showing in enlarged scale primary sections of FIG. 2, recessed portions 115L and 115R concaved inwardly in the vehicle width direction are provided in the opposite side surfaces of the headlight unit 59.

Namely, the headlight unit 59 is narrowed in its position partway in a height direction of the vehicle so that the recessed portions 115L and 115R are formed only locally, and thus, reduction in the light emitting area of the headlight unit 59 can be minimized. In this way, it is possible to readily secure a predetermined or necessary light emitting area.

Further, the left air intake opening 111L is formed in a region surrounded by the recessed portion 115L concavely formed in the left side surface of the headlight unit 59, front portion of the left front upper side cowl 79L and front portion of the middle cowl 78L.

Similarly, the right air intake opening 111R is formed in a region surrounded by the recessed portion 115R concavely formed in the right side surface of the headlight unit 59, front portion of the right front upper side cowl 79R and front portion of the middle cowl 78R.

The following describe the cowl stay 71 supporting the front cowl 72.

Figure 4:
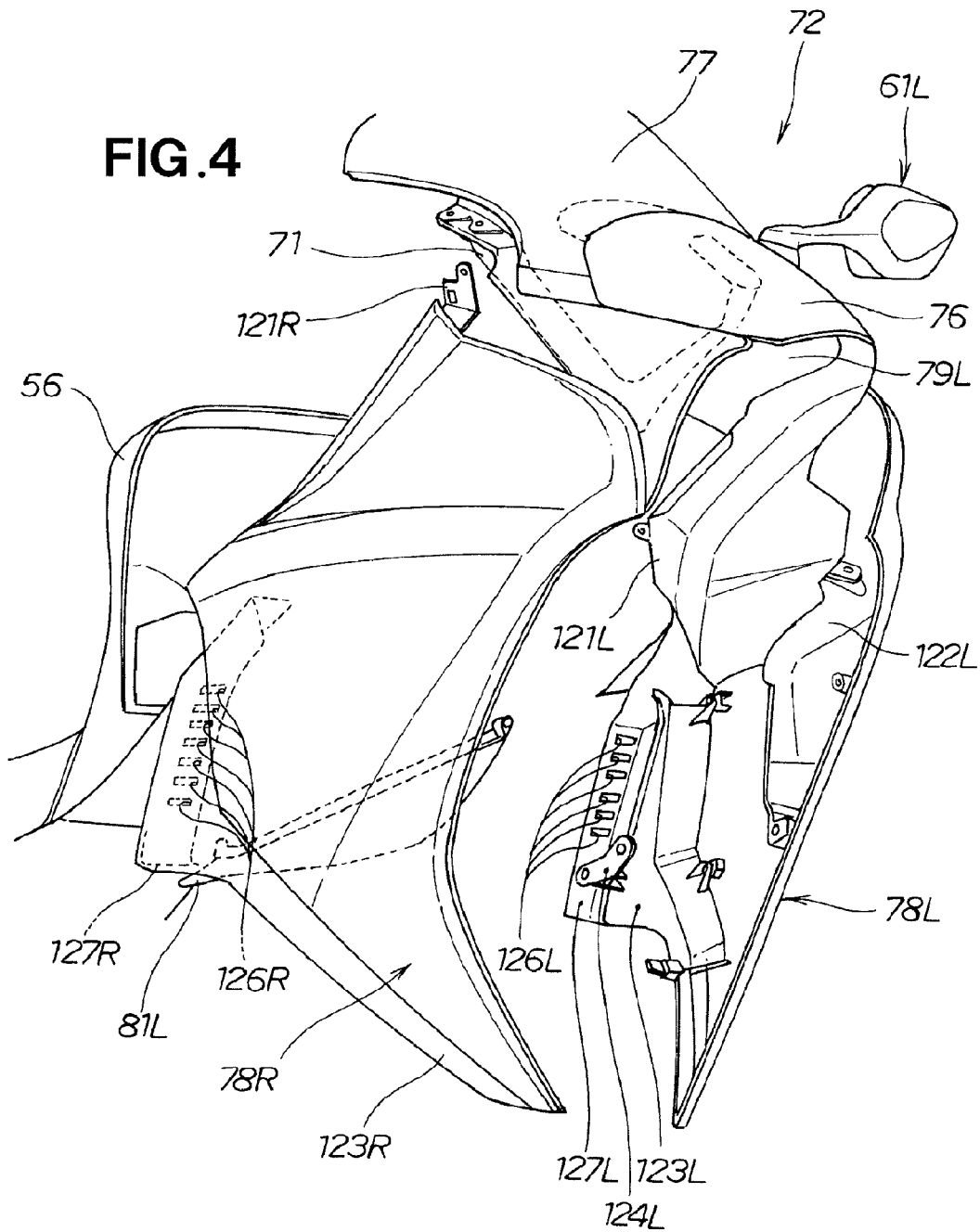
FIG. 4 is an exploded perspective view of a cowl provided in the vehicle.

As shown in FIG. 4, the cowl stay 71 supporting the front cowl 72 extends forward from the head pipe 12 (FIG. 1). The wind screen 77 and mirror 61L too are supported by the cowl stay 71.

The front upper side cowl 79L supporting opposite side portions of the wind screen 77 is provided on the wind screen 77.

The middle cowl 78L covering a front side portion of the vehicle is provided beneath the front upper side cowl 79L.

The front upper side cowl 79L is a member interconnecting the wind screen 77 and the middle cowl 78L.

An inner cowl 121L is provided inside the middle cowl 78L, and this inner cowl 121L is fixed at its upper end portion to the front upper side cowl 79L.

A front cowl panel 122L disposed inside and reinforcing the font portion of the middle cowl 78L is fixed to a front portion of the front upper side cowl 79L.

Layer cowls 123L and 123R are provided integrally with and along rear edge portions of the middle cowls 78L and 78R.

The layer cowl 123L is fixed to the main frame 14 (FIG. 1) via a vehicle-body-side stay 124L, and the layer cowl 123R is fixed to the main frame 14 in a similar manner to the layer cowl 123L.

Inner layers 127L and 127R are fixed to the layer cowls 123L and 123R. A plurality of openings 126L and 126R are formed in the respective inner layers 127L and 127R, and travel wind is discharged through these openings 126L and 126R.

A knee cover 81L to be sandwiched by driver's knees is fixed to the lower end of the fuel tank cover 56.

It is desirable that, in assembling the middle cowls 78L and 78R to the vehicle body, the layer cowls 123L and 123R and the inner layers 127L and 127R be mounted in advance to the middle cowls 78L and 78R through a sub assembly step or the like, and then, the middle cowls 78L and 78R be assembled to the vehicle body.

The following describe a layout of an air cleaner.

Figure 5:
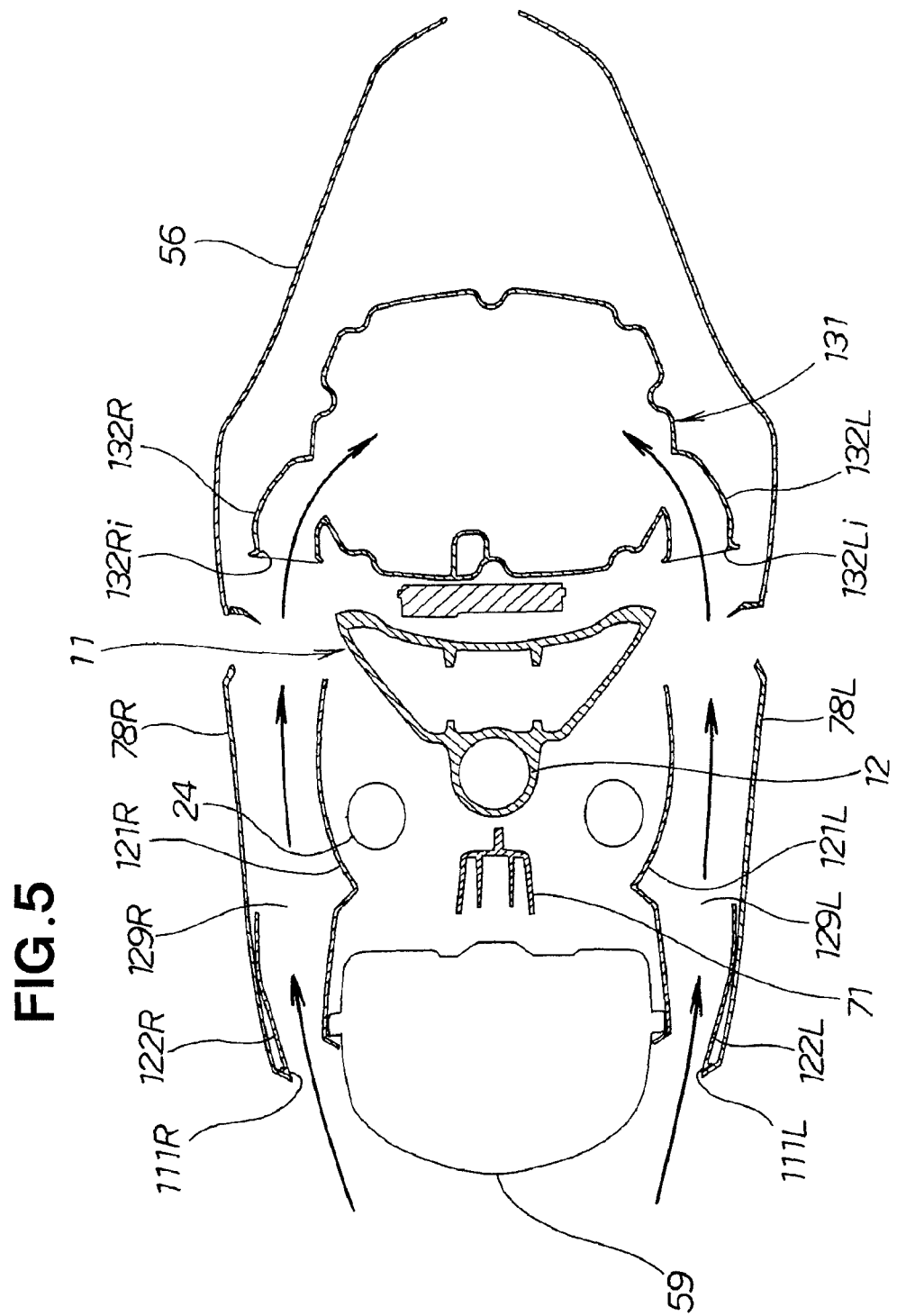
FIG. 5 is a sectional view taken along line 5-5 of FIG. 1.

As shown in FIG. 5 that is a sectional view taken along the 5-5 line of FIG. 1, the front cowl panels 122L and 122R are provided inside the middle cowls 78L and 78R to reinforce the font portions of the middle cowls 78L and 78R, and the inner cowls 121L and 121R are provided inside the middle cowls 78L and 78R and extend from left and right side portions of the headlight unit 59 to behind the headlight unit 59.

Further, wind directing passages 129L and 129R for directing travel wind introduced through the air intake openings 111L and 111R are formed between the middle cowls 78L and 78R and the inner cowls 121L and 121R.

Furthermore, the air cleaner 131 is provided behind the wind directing passages 129L and 129R. More specifically, air intake duct inlets 132Li and 132Ri have inlets facing corresponding outlets of the wind directing passages 129L and 129R.

As indicated by arrows, part of travel wind flowing in the wind directing passages 129L and 129R flow through the air intake ducts 132L and 132R to be introduced into the air cleaner 131.

Namely, because the wind directing passages 129L and 129R are formed using the middle cowls 78L and 78R and inner cowls 121L and 121R, the wind directing passages 129L and 129R need not be constructed of separate ducts, so that the number of necessary component parts can be reduced.

Namely, the air intake ducts 132L and 132R only have to extend forward from the air cleaner 131 to the wind directing passages 129L and 129R. In order words, the air intake ducts 132L and 132R of the air cleaner 131 need not extend over a long distance, and thus, it is possible to reduce the length of the air intake ducts 132L and 132R.

For that purpose, the wind directing passages 129L and 129R are each formed in a relatively wide and smooth shape to allow travel wind to flow smoothly therealong.

Figure 6:
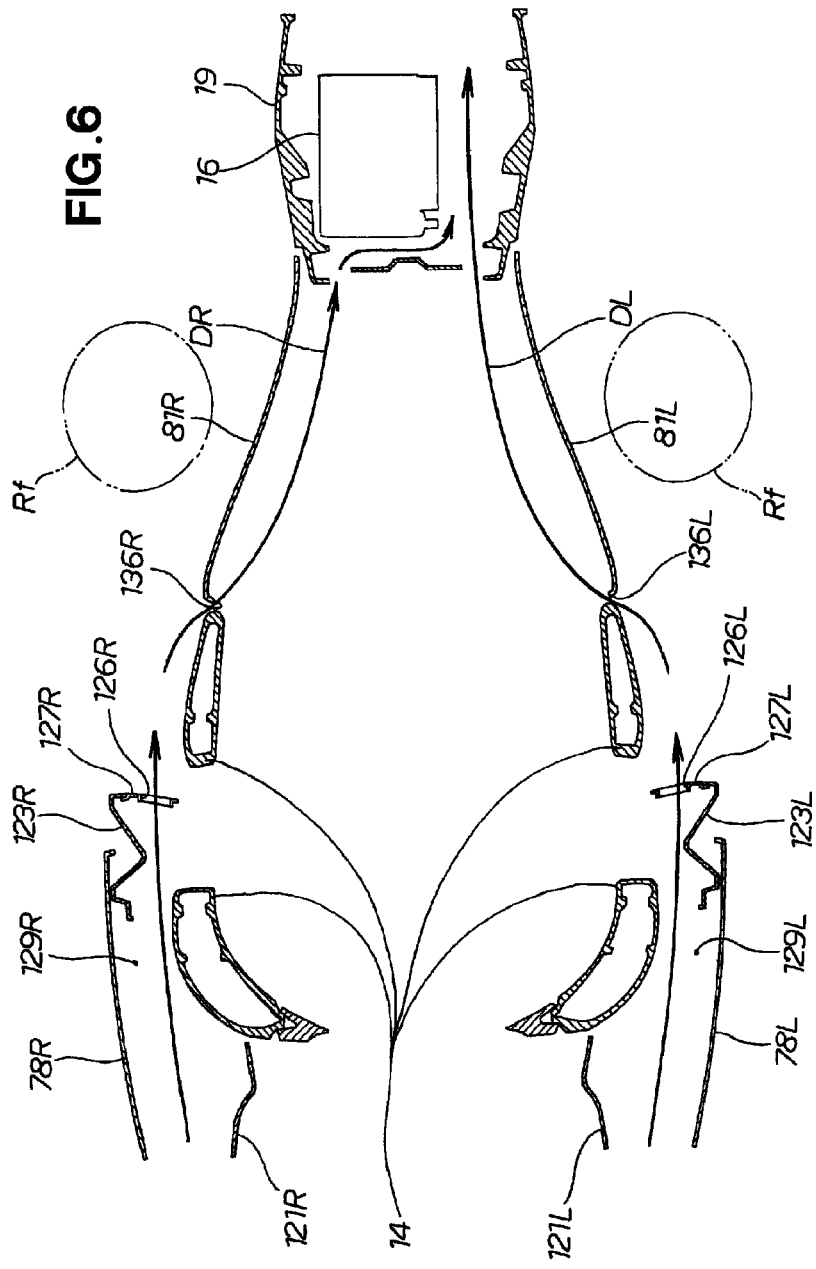
FIG. 6 is a sectional view taken along line 6-6 of FIG. 1.

With reference to FIG. 6, the following describe wind flowing to driver's legs.

As shown in FIG. 6 that is a sectional view taken along the 6-6 line of FIG. 1, the layer cowls 123L and 123R are provided on rear end portions of the corresponding middle cowls 78L and 78R.

The inner layers 127L and 127R are fixed to the layer cowls 123L and 123R, and the inner layers 127L and 127R have the openings 126L and 126R for discharging part of introduced travel wind having passed the wind directing passages 129L and 129R.

Because the openings 126L and 126R for directing the part of introduced travel wind, having passed through the wind directing passages 129L and 129R, to the driver's legs Rf are provided behind the wind directing passages 129L and 129R, the part of introduced travel wind can be directed to the driver's legs Rf. Further, because the introduced travel wind is directed into the air cleaner 131 (FIG. 5) and to the driver's legs Rf through the openings 126L and 126R, the introduced travel wind can be used with an increased efficiency.

Furthermore, the knee covers 81L and 81R to be sandwiched by the driver's legs Rf during driving of the vehicle are provided behind the openings 126L and 126R.

Knee cover air inlets 136L and 136R for introducing part of the travel wind to inside the knee covers 81L and 81R are provided in front of the knee covers 81L and 81R.

Part of introduced travel wind output through the openings 126L and 126R is introduced to inside the knee covers 81L and 81R through the knee cover air inlets 136L and 136R, and thus, the part of introduced travel wind flows as indicated by arrow DL and DR to thereby cool the electric components, such as the battery 16, provided in a rear section of the vehicle. Because the part of introduced travel wind can cool the electric components in this manner, the travel wind can be used with an even further increased efficiency.

Figure 7:
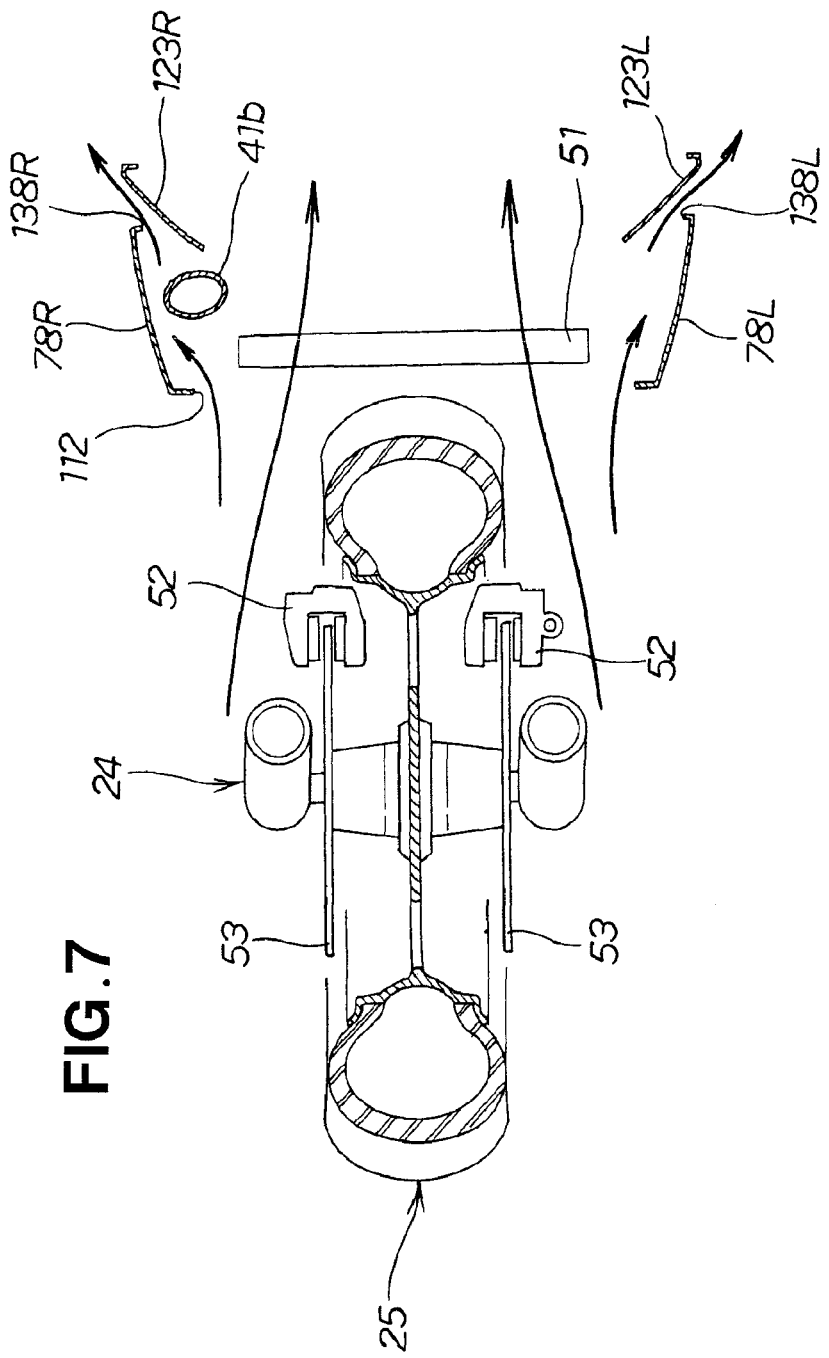
FIG. 7 is a sectional view taken along line 7-7 of FIG. 1.

With reference to FIG. 7, the following describe relationship between the radiator and the travel wind.

As shown in FIG. 7 that is a sectional view taken along the 7-7 line of FIG. 1, the radiator unit 51 is disposed behind the front wheel 25, the left and right middle cowls 78L and 78R are disposed laterally outwardly of the radiator unit 51, and the radiator air intake opening 112 is provided between the left and right middle cowls 78L and 78R.

Much of the travel wind taken in through the radiator air intake opening 112 passes through the radiator unit 51 to cool the radiator unit 51. The remaining part of the travel wind flows out of the vehicle through other openings 138L and 138R formed between the middle cowls 78L and 78R and the layer cowls 123L and 123R provided behind the middle cowls 78L and 78R. These airflows also function to cool a discharge pipe 41b located near one of the other openings 138R.

Now, with reference to FIGS. 8 and 9, a description will be given about behavior of the above-described vehicle.

Figure 8:
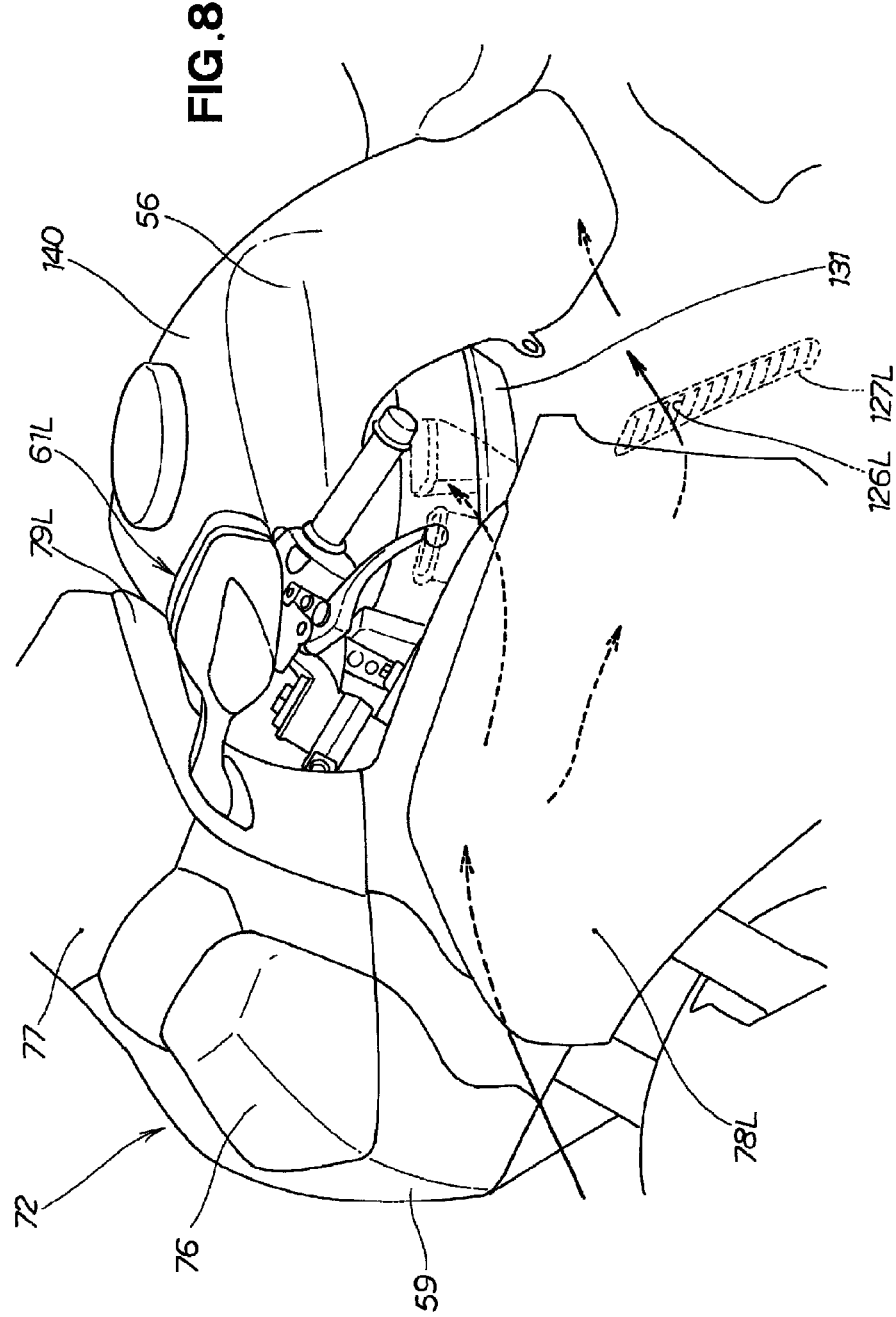
FIG. 8 is a perspective view explanatory of behavior of the vehicle of the present invention.

Travel wind introduced through the air intake openings 111L and 111R (FIG. 2) passes through a region inside the middle cowl 78L to enter the air cleaner 131, as shown in FIG. 8.

Figure 9:
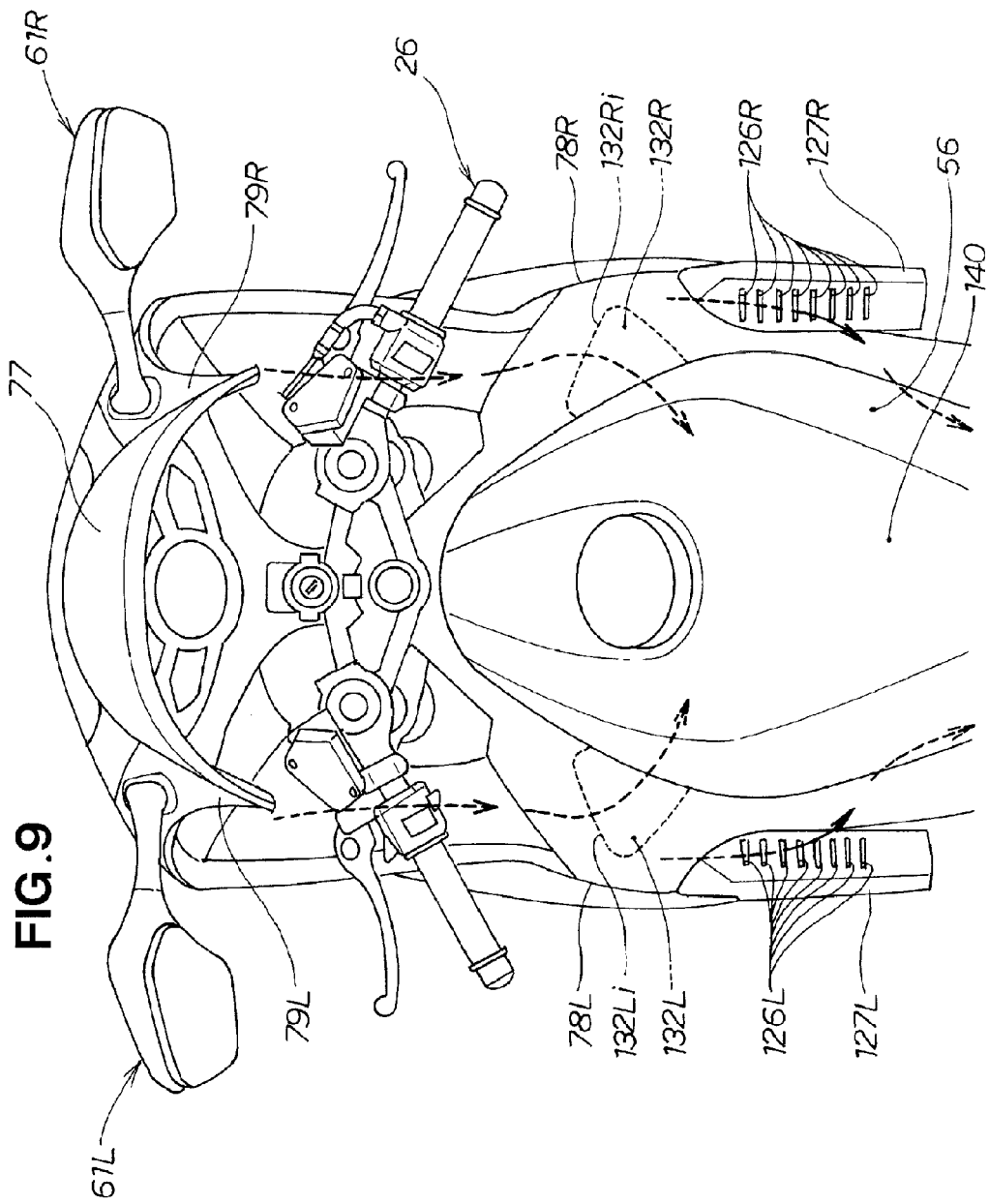
FIG. 9 is a plan view explanatory of behavior of the vehicle of the present invention.

Further, as shown in FIG. 9, part of the introduced travel wind is directed to the driver's legs Rf (FIG. 6) through the openings 126L and 126R formed in the inner layers 127L and 127R, which can prevent heat of the engine from transmitting to the driver's legs Rf and thereby enhance driving comfort.

Figure 10:
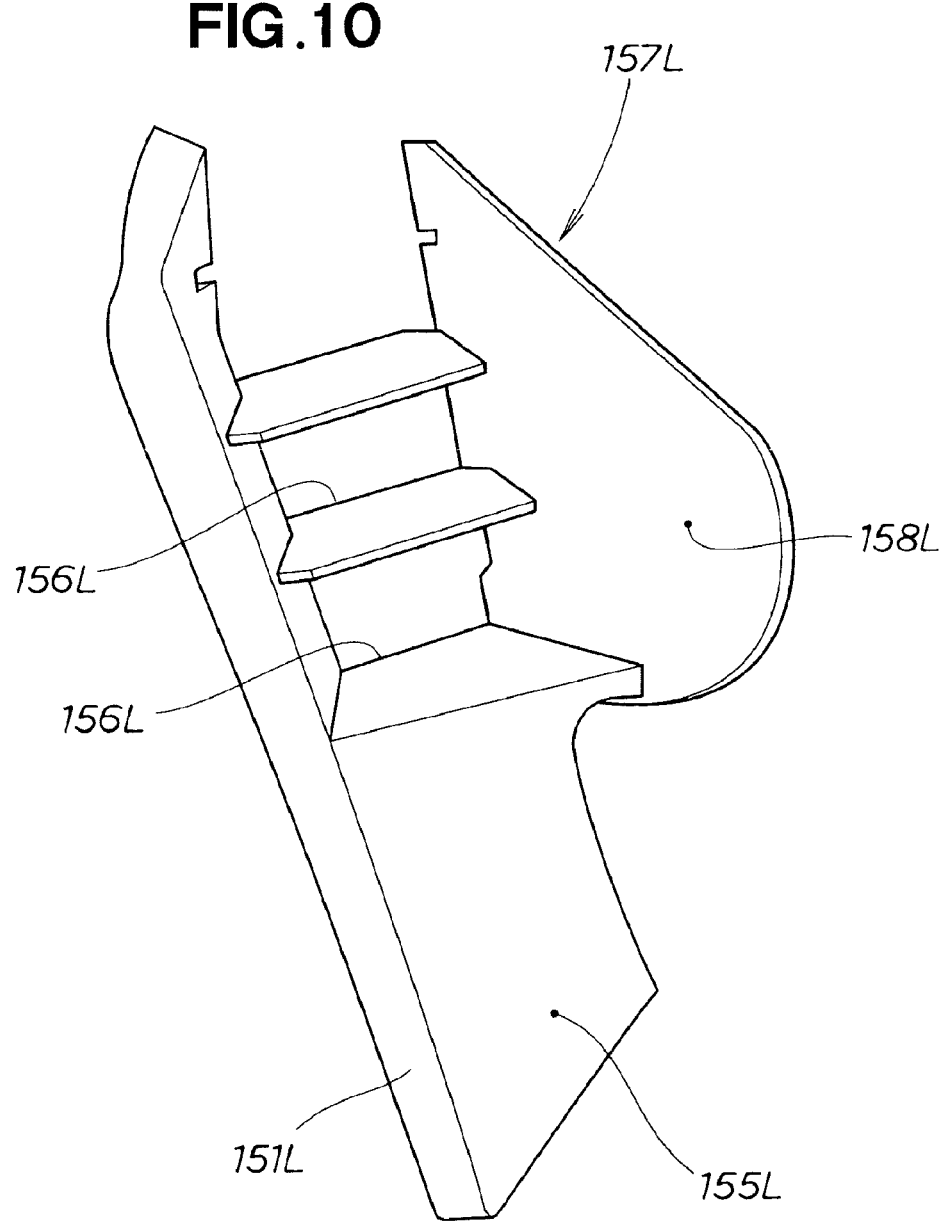
FIG. 10 is a perspective view of a modification of an inner layer.

The following describe a preferred form of the inner layers, with reference to FIG. 10.

As shown in FIG. 10, the left inner layer 157L includes: a mounting portion 151L mounted to the layer cowl 123L (FIG. 4); a rear wall 155L located inwardly, in the vehicle width direction, of the mounting portion 151L and having a plurality of openings 156L and an inner wall 158L located inwardly of the rear wall 155L and closing a gap formed between the left inner layer 157L and the main frame 14.

A difference between the inner layer 127L shown in FIG. 4 and the inner layer 157L shown in FIG. 10 is whether or not there is the inner wall 158L. The right inner layer 157R is constructed in a similar manner to the above-described inner layer 157L and thus will not be described here to avoid unnecessary duplication.

Figure 11:
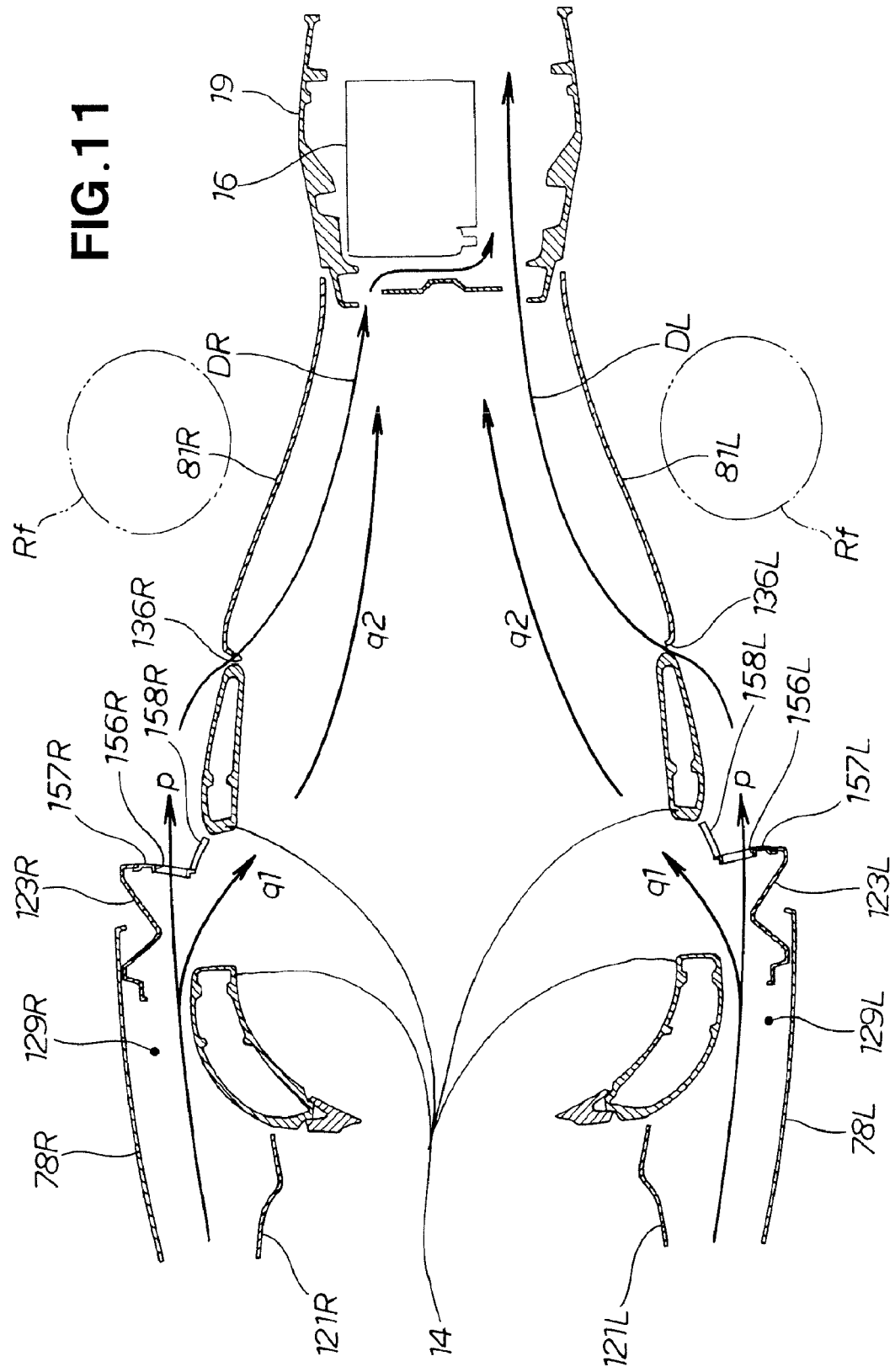
FIG. 11 is a view explanatory of a modification of a construction shown in FIG. 6.

With reference to FIG. 11, the following describe a modification of the construction shown in FIG. 6.

FIG. 11 is a view explanatory of behavior of the vehicle in a state where the inner layers 157L and 157R are fixed to the layer cowls 123L and 123R.

In the figure, introduced travel wind, having passed through the wind directing passages 129L and 129R, flows through the openings 156L and 156R as indicated by arrows p, while part of the introduced travel wind branches to be directed by the inner walls 158L and 158R as indicated by arrows q1 and then directed to the electric components, including the battery 16, as indicated by arrows q2.

Because the inner walls 158L and 158R are added to the inner layers 157L and 157R as noted above, travel wind introduced to inside the vehicle body can be used with an even further increased efficiency.

Figure 12:
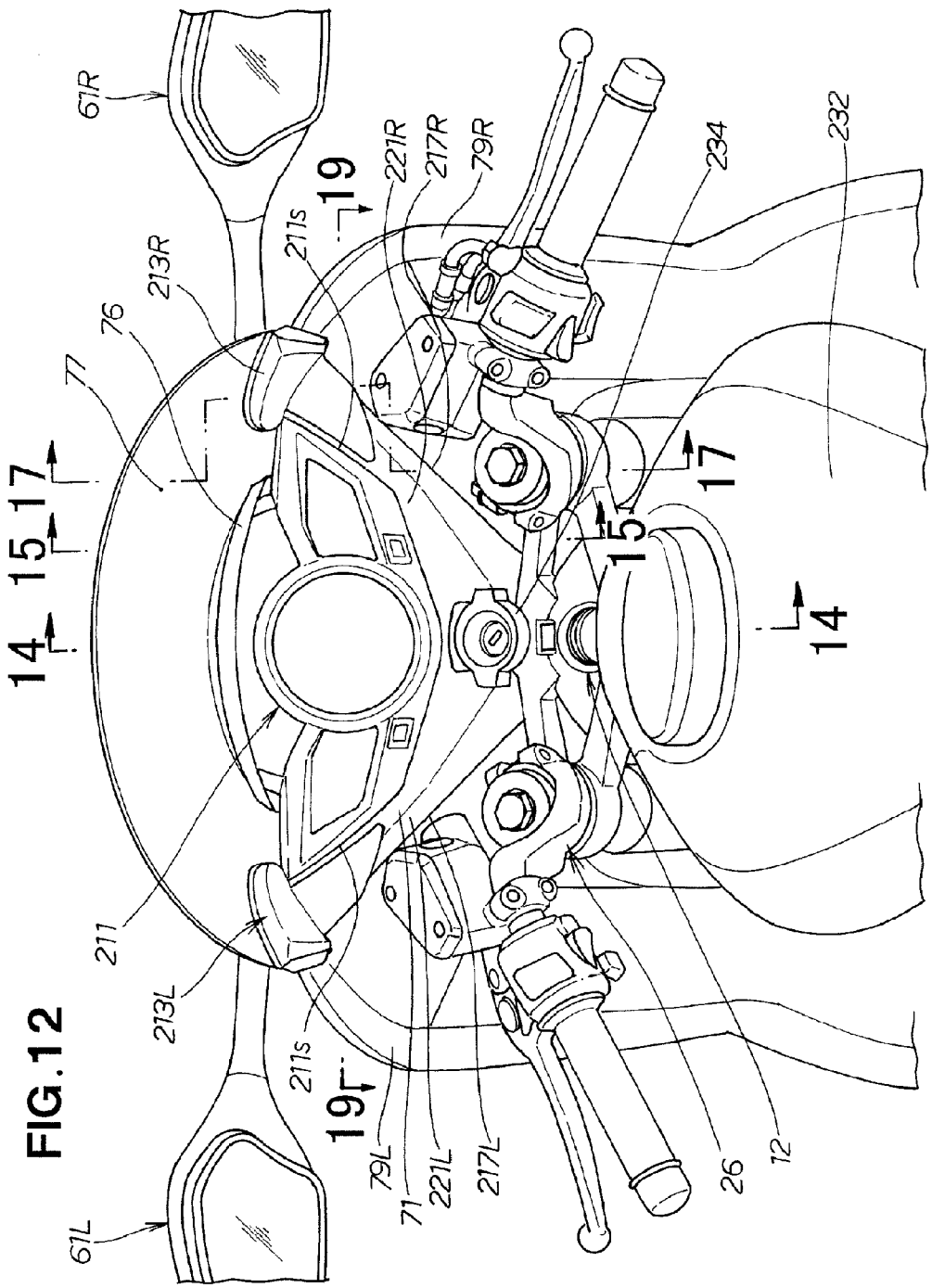
FIG. 12 is a rear view showing primary components of the vehicle with a meter section attached to a cowl stay.
Figure 13:
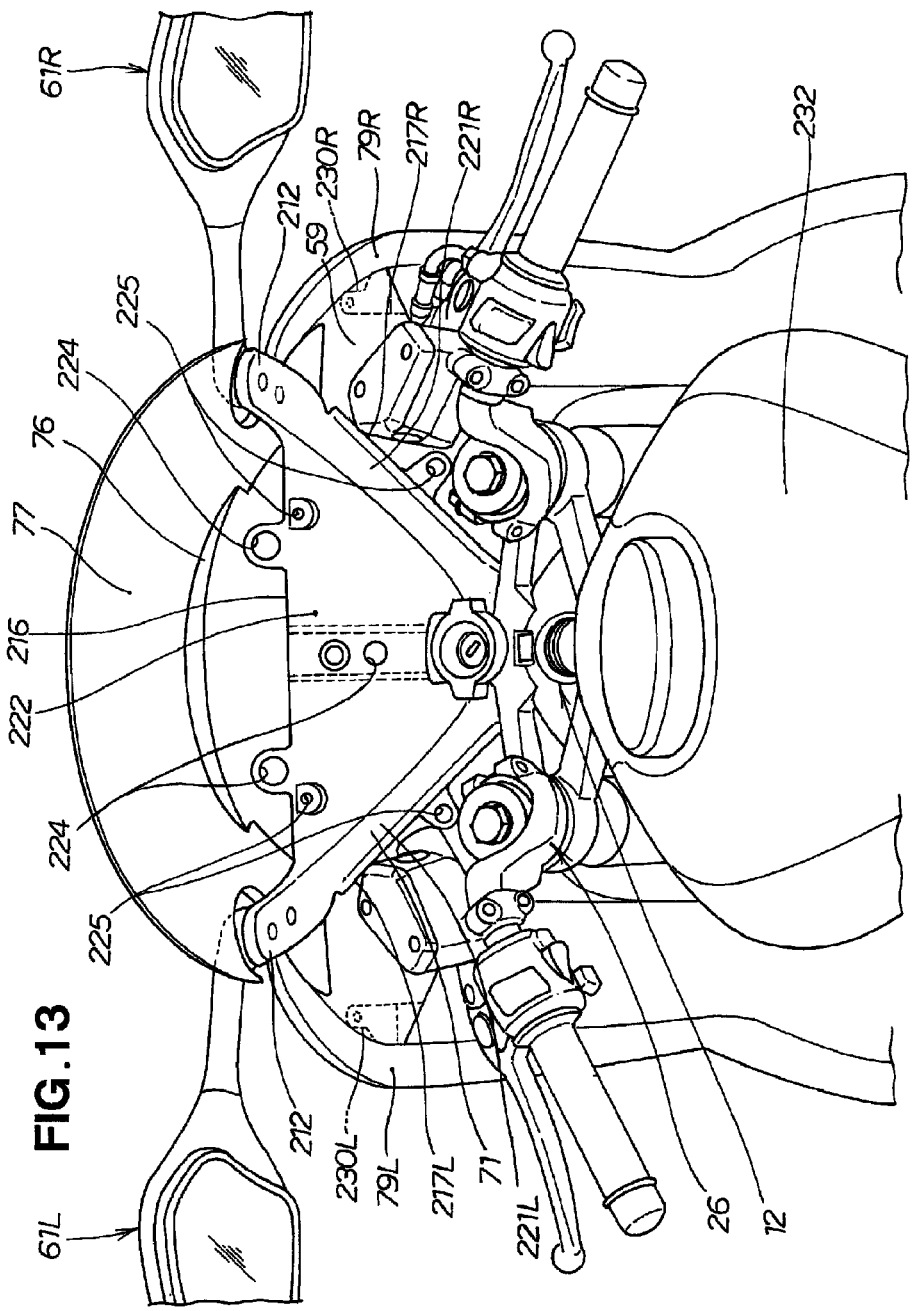
FIG. 13 is a rear view showing the primary components of the vehicle with the meter section detached from the cowl stay.

With reference to FIGS. 12 and 13, the following describe the primary sections in a state where a meter section is attached to the cowl stay and in a state where the meter section is detached from the cowl stay.

As shown in FIG. 12, the cowl stay 71 supporting the wind screen 77 extends forward from the head pipe 12, and a meter section 211 is attached to the cowl stay 71.

The meter section 211 includes a speed meter, blinker display, transmission mode display, etc.

As shown in FIG. 13, the cowl stay 71 has a substantially triangular shape having a base 216, located on its upper side, and left and right oblique sides 217L and 217R. Mirror mounting sections 212 are provided at opposite end portions of the base 216, i.e. at upper end portions of the left and right oblique sides 217L and 217, and the left and right mirrors 61L and 61R are fixedly mounted to the mirror mounting sections 212. The mirror mounting sections 212 are normally invisible from outside because they are covered with bracket covers 213L and 213R.

A left ridge portion 221L is formed along the left oblique side 217L and extends along the left side surface 211s (FIG. 12).

Similarly, a right ridge portion 221R is formed along the right oblique side 217R and extends along the right side surface 211s (FIG. 12).

A flat plate portion 222 is formed between the left and right ridge portions 221L and 221R, and a plurality of meter mounting portions 224 and headlight unit mounting portions 225 are provided on the flat plate portion 222. The headlight unit 59 (FIG. 1) is mounted on the headlight mounting portions 225, and the meter section 211 (FIG. 12) is mounted on the meter mounting portions 224. The headlight mounting portions 225 are also provided on projections protruding leftward and rightward from the left and right oblique sides 217L and 217R.

Figure 14:
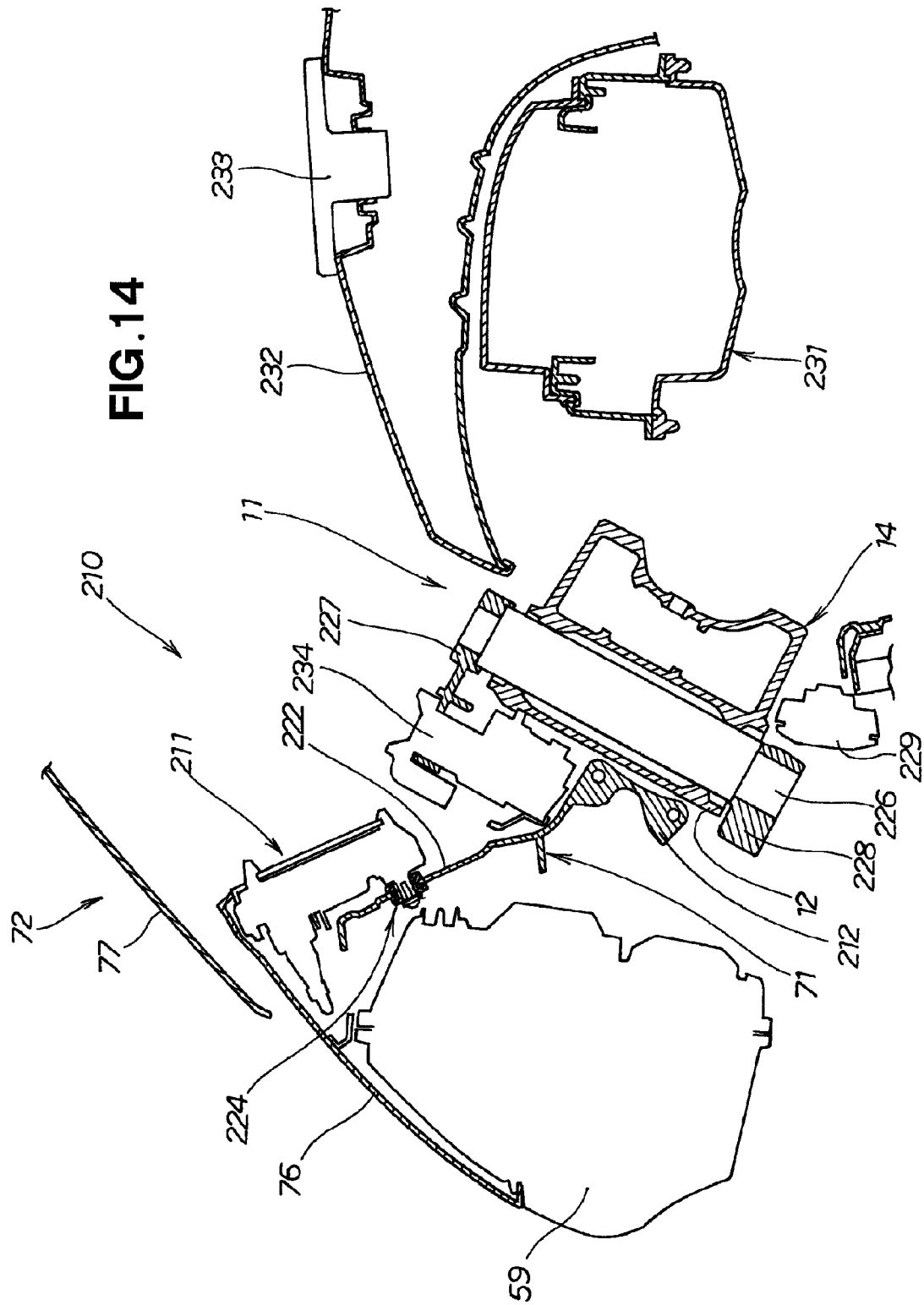
FIG. 14 is a sectional view taken along line 14-14 of FIG. 12.

As shown in FIG. 14 that is a sectional view taken along the 14-14 line of FIG. 12, the cowl stay 71 includes a head-pipe mounted portion 212 mounted to the head pipe 12. Namely, the cowl stay 71 is a member extending obliquely forward and upward from the head-pipe mounted portion 212. The meter section 211 is attached to the upper surface of the meter mounting portions 224 provided on the flat plate portion 222.

The headlight unit 59 is disposed in front of the cowl stay 71. The upper center cowl 76, which is part of the front cowl 72, is provided in front of the headlight unit 59 and meter 211. The wind screen 77 is disposed over the upper center cowl 76.

Namely, a cowl stay structure 210 of the vehicle comprises: the cowl stay 71 extending from the head pipe 12, constituting a front end portion of the vehicle body frame 11, and supporting the window screen 77 that functions as a cowl partly covering a front section of the vehicle; and the meter section 211 mounted on the cowl stay 71.

A steering shaft 226 is rotatably mounted in the head pipe 12, and a top bridge 227 and bottom bridge 228 are mounted on the upper and lower ends of the steering shaft 226. Further, a key cylinder switch 234 as an engine switch is provided on a front portion of the top bridge 227, and the alarming horn 229 is provided behind the bottom bridge 228.

Further, the fuel tank 232 is provided behind the top bridge 227, and an air cleaner box 231 is under a front portion of the fuel tank 232. Fuel can be refilled with a tank cap 233 opened.

Figure 15:
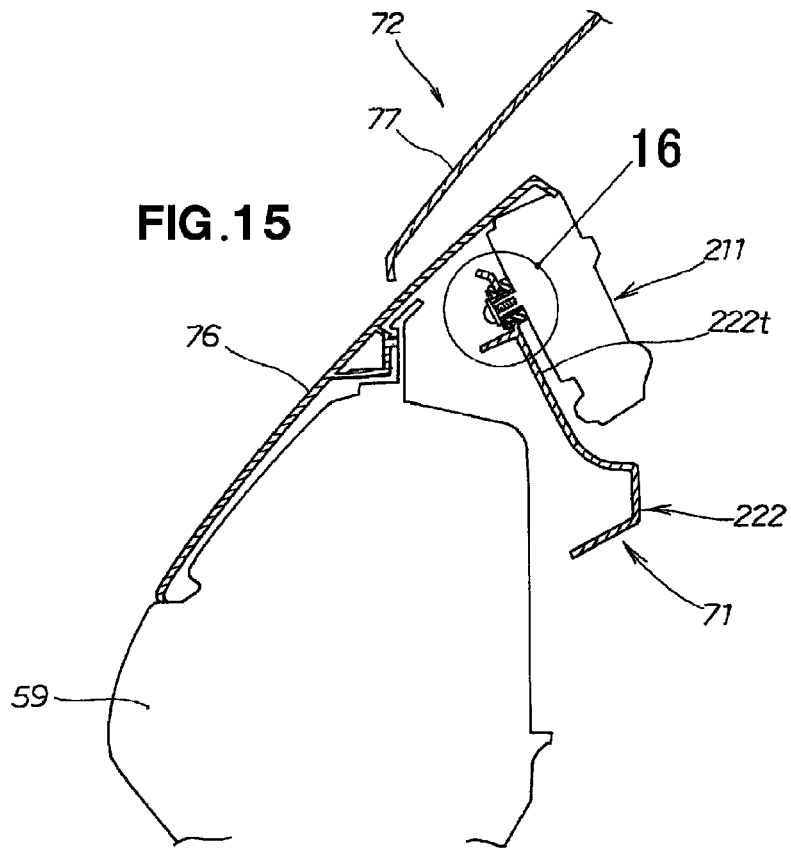
FIG. 15 is a sectional view taken along line 15-15 of FIG. 12.

The meter section 211 is resiliently attached to the flat plate portion 222 shown in FIG. 15 in a manner to be described below with reference to FIG. 16.

Figure 16:
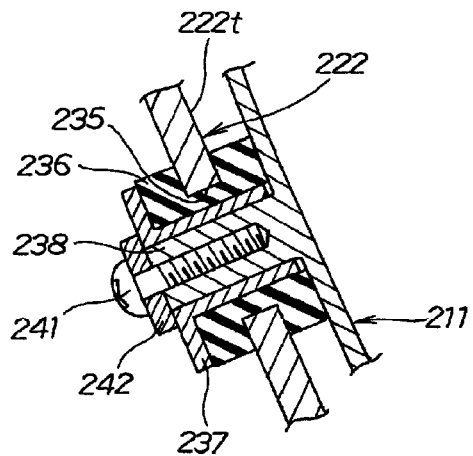
FIG. 16 is an enlarged view of a section encircled at 16 in FIG. 15.

As shown in FIG. 16, a shock-absorbing member 236 is inserted in a meter mounting hole 235 formed in the flat plate portion 222, and a flanged collar member 237 is fitted over the shock-absorbing member 236.

The meter section 211 has a mounting leg 238 fitted in the collar member 237. A fastener member 241, such as a screw, is screwed into the mounting leg 238 with a washer 242 abutted against the distal end surface of the mounting leg 238. In this manner, the meter section 211 is resiliently supported on the flat plate portion 222.

The following describe how the headlight unit 59 is mounted.

Figure 17:
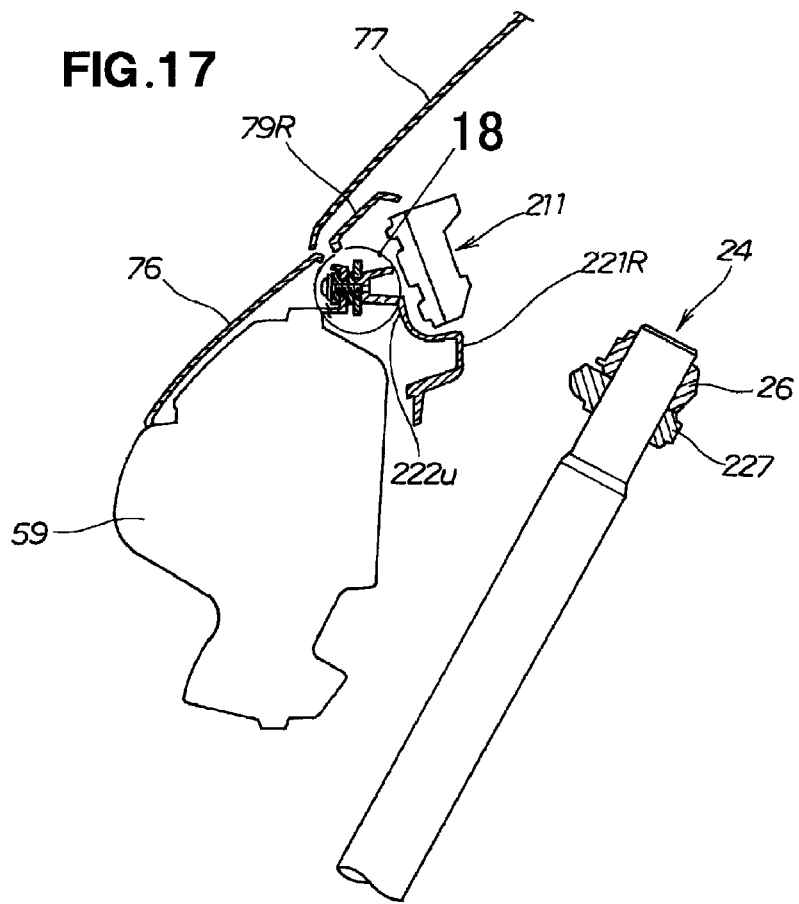
FIG. 17 is a sectional view taken along line 17-17 of FIG. 12.
Figure 18:
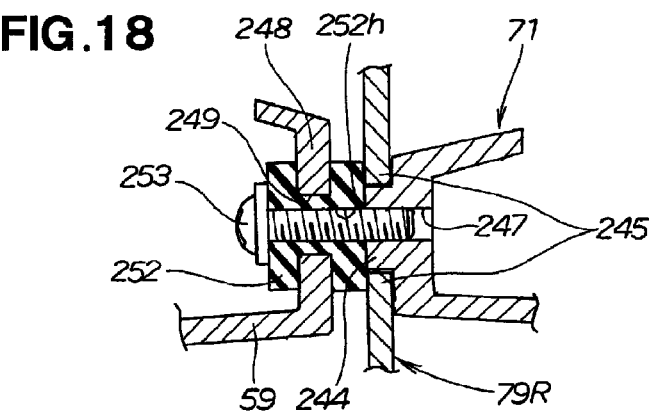
FIG. 18 is an enlarged view of a section encircled at 18 in FIG. 17.

As shown in FIGS. 17 and 18, a projection 244 projects from the underside 222u toward the front of the vehicle.

The front upper side cowl 79R has claws 245, and a distal end portion of the projection 244 is inserted between the claws 245. In this manner, the front upper side cowl 79R is appropriately positioned relative to the cowl stay 71.

The headlight unit 59 includes a mounting bracket 248 having a hole 249. A shock absorbing member 252 is inserted in the hole 249.

A fastening bolt 253 is passed through a central hole 252h of the shock absorbing member 252 and screwed into a headlight-unit mounting hole 247. In this manner, the headlight unit 59 is mounted on the cowl stay 71.

Figure 19:
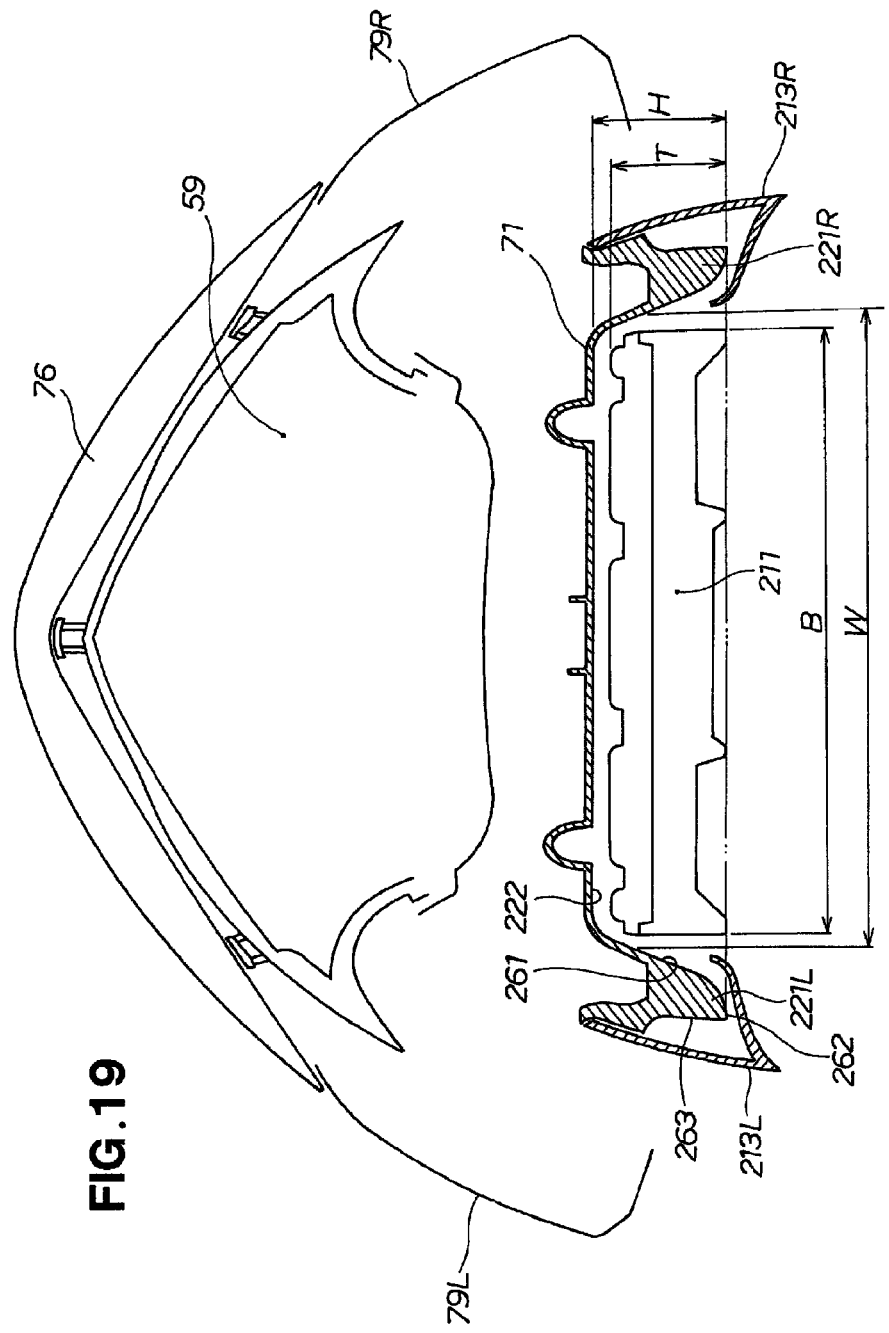
FIG. 19 is a sectional view taken along line 19-19 of FIG. 12.

With reference to FIG. 19, the following describe how the meter section 211 is embedded in the cowl stay 71.

As shown in FIG. 19, the meter section 211 has a length (B) in the vehicle width direction which is substantially equal to a distance (W) between the left ridge portion 221L and the right ridge portion 221R of the cowl stay 71. The meter section 211 is mounted to the cowl stay 71 by being fitted between the left ridge portion 221L and the right ridge portion 221R.

In addition, each of the ridge portions 221L and 221R has a projecting length (H) that is substantially equal to a thickness (T) of the meter section 211.

The ridge portion 221L includes an inner wall surface 261 extending rearward from one end of the flat plate portion 222, and an outer wall surface 263 extending forward from a rear apex 262 of the inner wall surface 261. The right ridge portion 221R is constructed similarly to the left ridge portion 221L, and thus, the construction of the right ridge portion 221R will not be described here to avoid unnecessary duplication.

Because the projecting length (H) of each of the left and right ridge portions 221L and 221R is substantially equal to the thickness (T) of the meter section 211, the meter section 211 and cowl stay 71 can have an enhanced outer appearance.

Further, because the cowl stay 71 has the ridge portions 221L and 221R on its left and right sides, the cowl stay 71 can have an increased rigidity.

Furthermore, as set forth above in relation to FIG. 13, the cowl stay 71 has a substantially triangular shape, which has the base 216 located on its upper side and the left and right oblique sides 217L and 217R located lower than the base 216, and in which the base 216 is longer than each of the oblique sides 217L and 217R. With each of the oblique sides 217L and 217R shorter than the base 216, a downward projecting amount of the cowl stay 71 can be reduced as compared to a case where each of the oblique sides 217L and 217R is longer than the base 216.

The reduced downward projecting amount of the cowl stay 71 can make it easier for the driver or the like to put his or her hand to inside the cowl stay 71 from below, and thus, a bulb of the headlight unit 59 can be replaced with an increased ease.

The following describe a construction of the rear section of the vehicle.

As shown in FIG. 1, two exhaust pipes 41c and 41d extend rearward from the rear cylinders 36 and then extend forward. Then, these exhaust pipes 41c and 41d merge into a collecting duct 43 as shown in FIG. 20.

The collecting duct 43 is connected to the catalyst tube 45 together with the exhaust pipes 41a and 41d extending from the front cylinder 35 shown in FIG. 1.

Figure 20:
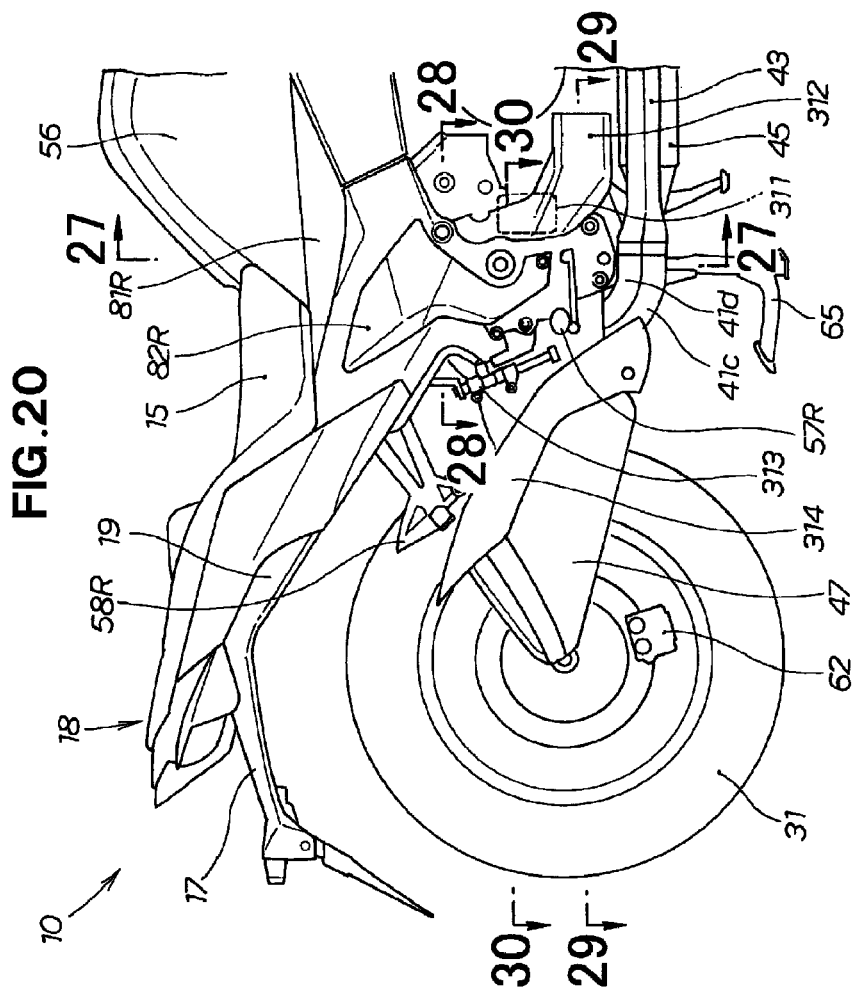
FIG. 20 is a right side view of a rear section of the vehicle.

As further shown in FIG. 20, a reservoir tank 311 for storing radiator fluid is disposed obliquely above the catalyst tube 45, and this reservoir tank 311 is covered with a reservoir tank cover 312.

A rear master cylinder 313 is disposed behind the reservoir tank 311. Braking pressure produced in the rear master cylinder 313 is supplied to the rear brake caliper 62.

A silencer cover 314 is disposed between the rear master cylinder 313 and the silencer 47 so that heat from the silencer 47 does not transmit to the rear master cylinder 313.

Because the catalyst tube 42 is disposed beneath the engine 13 as shown in FIG. 1, the reservoir tank 311 is disposed to the right of a rear portion of the engine 13.

The following describe relationship between the pivot plates and the pivot plate covers.

Figure 21:
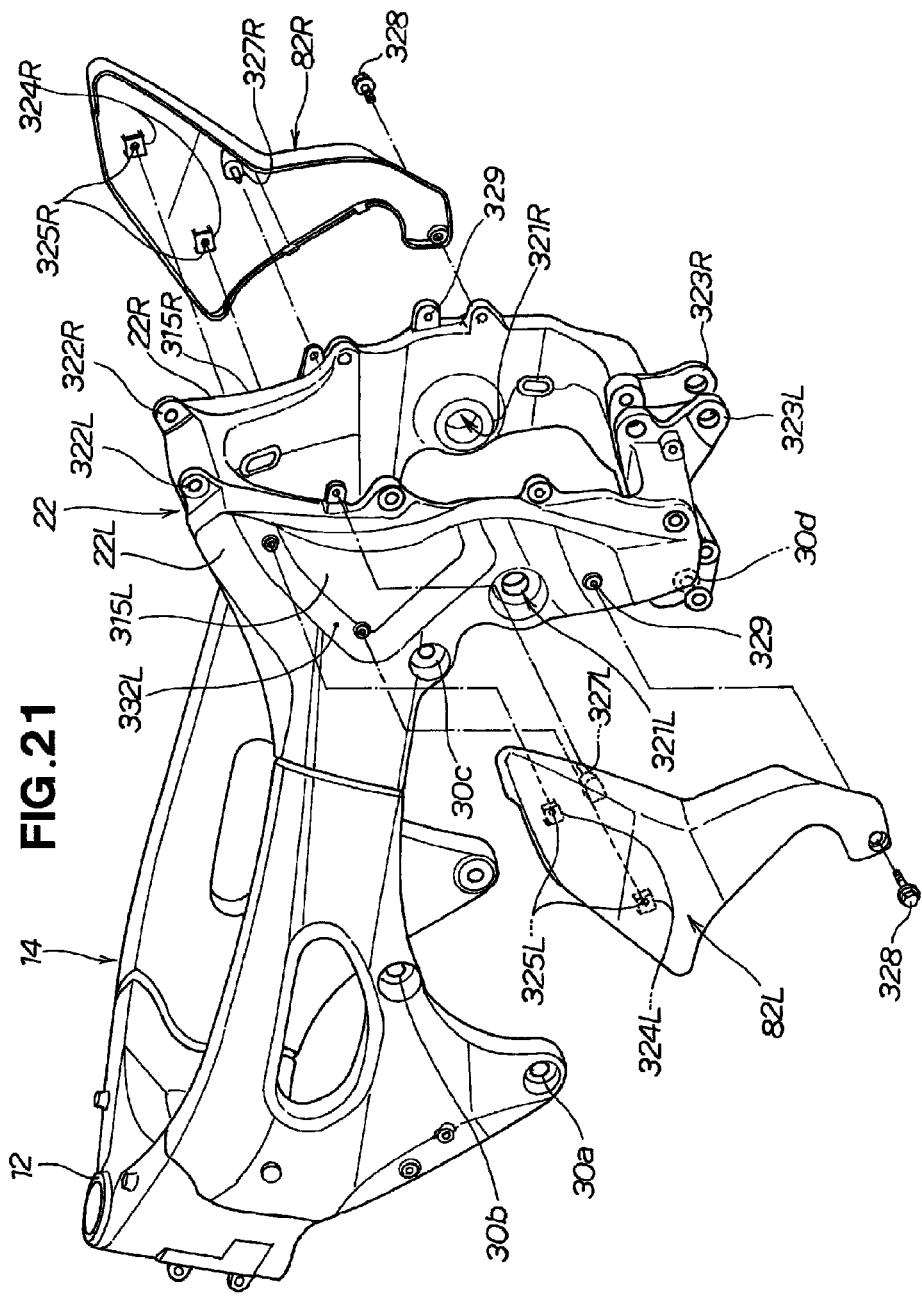
FIG. 21 is an exploded perspective view explanatory of a relationship between pivot plates and pivot plate covers.

As shown in FIG. 21, the pivot plates 22L and 22R have, in their upper regions, recessed portions 315L and 315R concaved toward the center of the vehicle body. The pivot plate covers 82L and 82R are attached to the pivot plates 22L and 22R by being fitted in the recessed portions 315L and 315R. Each of the recessed portions 315L and 315R functions as a tunnel for causing travel wind to flow along the inner surface of the corresponding pivot plate cover 82L or 82R.

A pivot shaft support portion 321L for supporting a pivot shaft is provided in a middle region, in the height direction of the vehicle, of the left pivot plate 22L, while a pivot shaft support portion 321R for supporting a pivot shaft is provided in a middle region, in the height direction of the vehicle, of the right pivot plate 22R. A rear frame connection portion 322L for connecting the rear frame extends from an upper end portion of the left pivot plate 22L, while a rear frame connection portion 322R for connecting the rear frame extends from an upper end portion of the right pivot plate 22R.

Further, a link bracket 323L extends from a lower end portion of the left pivot plate 22L, while a link bracket 323R extends from a lower end portion of the right pivot plate 22R. These link brackets 323L and 323R each perform a function of supporting a link provided on the swing arm 28 (FIG. 1).

Two engaging seats 324R are provided on the inner surface of the right pivot plate cover 82R and each have a female threaded hole 325R. Further, an engaging claw 327R extends from the inner surface of the right pivot plate cover 82R.

Such a pivot plate cover 82R is attached to the pivot plate 22R in the following manner.

First, the engaging claw 327R of the right pivot plate cover 82R is inserted into a small hole formed in the right pivot plate 22R, so that the pivot plate cover 82R is approximately positioned relative to the pivot plate 22R.

Then, a bolt 328 is passed through a lower end portion of the pivot plate cover 82R and screwed into a mounting hole 329 of the pivot plate 2211. After that, screws are passed through the pivot plate 22R and screwed into the female threaded holes 325R. In this manner, the pivot plate cover 82R is detachably attached to the right pivot plate 22R.

The order in which the bolt 328 and screws are fastened may be changed as desired.

With reference to FIGS. 22 to 25, the following describe in detail the left pivot plate cover 82L.

Figure 22:
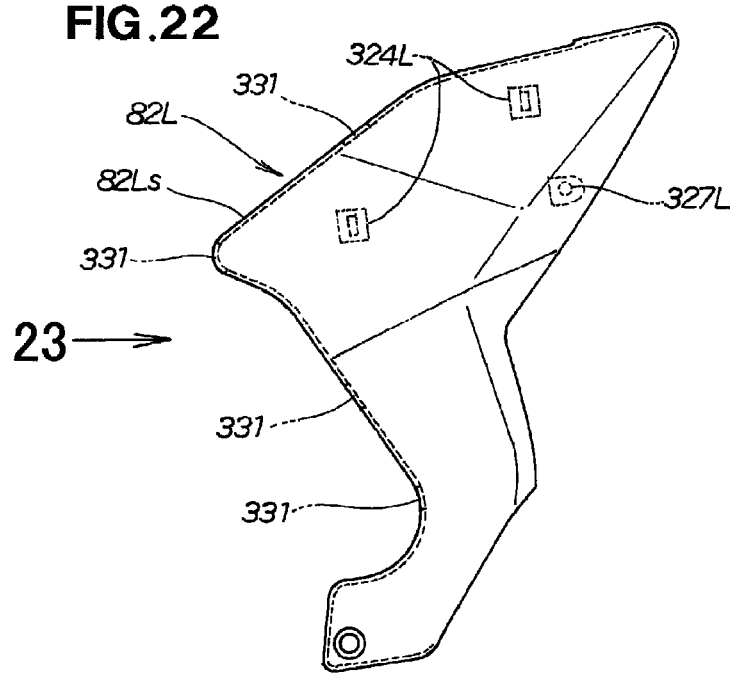
FIG. 22 is a front view of the pivot plate cover.
Figure 24:
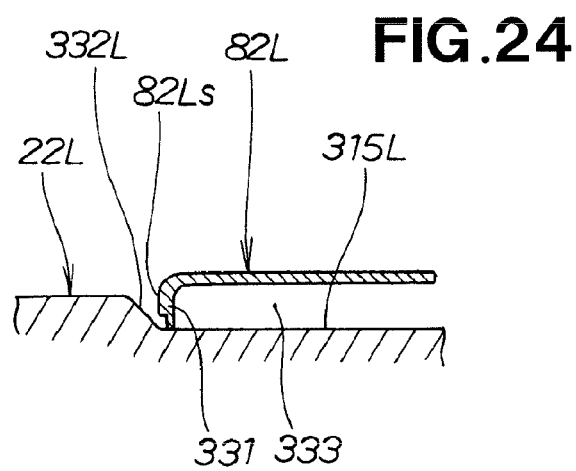
FIG. 24 is a sectional view explanatory of a relationship between the pivot plate and the pivot plate cover.

As shown in FIG. 22, the left pivot plate cover 82L has a plurality of ribs 331 formed on its outer periphery 82Ls and projecting inwardly of the vehicle body. As shown in FIG. 24, these ribs 331 are held in abutment against the pivot plate 22L.

A slanting edge portion 332L shown in FIG. 24 functions as follows.

As shown in FIG. 24, the pivot plate 22L has the recessed portion 315L concaved inwardly in the vehicle width direction. The recessed portion 315L has a gently slanting edge portion 332L, and this slanting edge portion 332L functions to prevent stress from concentrating on the recessed portion 315L. Namely, when the pivot plate 22L has been subjected to external force, the gently slanting edge portion 332L prevents stress concentration on the pivot plate 22L. Thus, despite the provision of the recessed portion 315L, it is possible to secure a necessary strength of the pivot plate 22L and thus minimize unwanted variation in operability of the vehicle due to the provision of the recessed portion 315L.

Note that the slanting edge portion 332L may be in the form of either a slanting surface or a curved surface.

Figure 23:
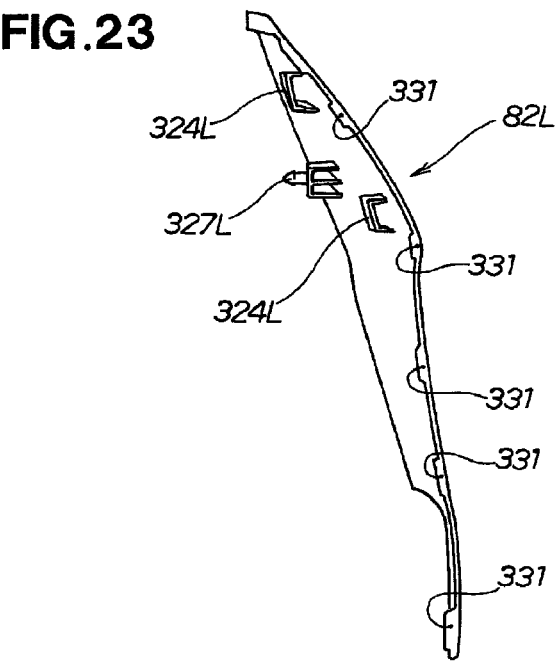
FIG. 23 is a view taken in the direction of arrow 23 of FIG. 22.

Further, as shown in FIG. 23, the ribs 331 are provided at spaced-apart intervals so that travel wind can pass between the ribs 331 to be directed to inside the pivot plate cover 82L. The thus-directed wind passes a gap 333 shown in FIG. 24.

Figure 25:
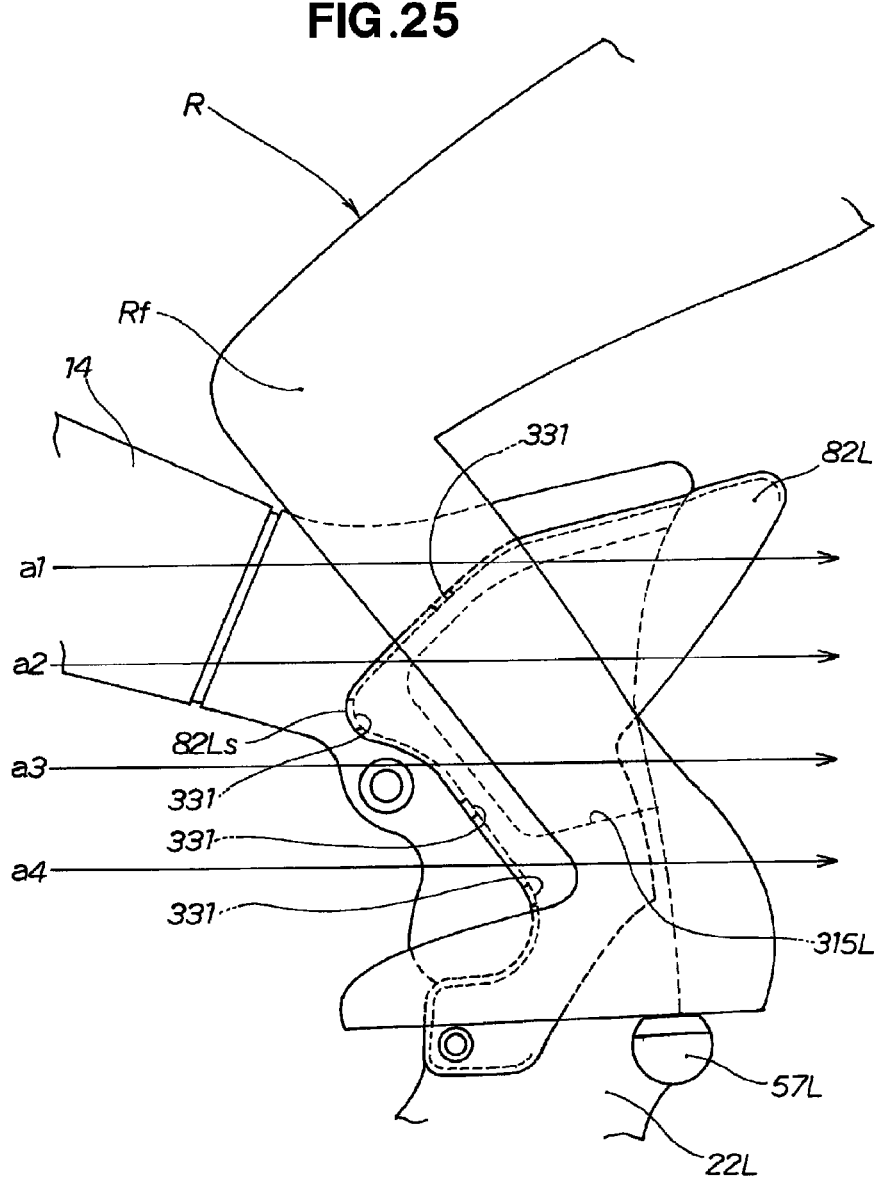
FIG. 25 is a view explanatory of behavior the pivot plate cover shown in FIG. 24.

More specifically, as shown in FIG. 25, travel wind passes between the ribs 131 and then passes inside the pivot plate cover 82L as indicated by arrow a1 to a4. Thus, heat can be prevented from transmitting from inside the main frame to the driver's leg Rf, so that driving comfort can be secured.

Figure 26:
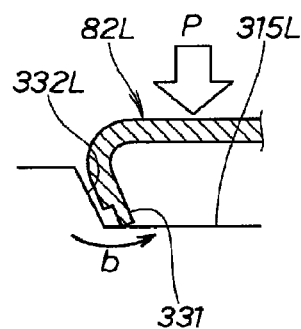
FIG. 26 is a view explanatory of behavior of the pivot plate cover when the pivot plate cover has been subjected to external force.

With reference to FIG. 26, the following describe behavior of the pivot plate cover 82L when the pivot plate cover 82L has been subjected to external force.

Once an external load P is applied to the pivot plate cover 82L, the pivot plate cover 82L may deform so that the rib 331 is displaced outward (leftward in the figure). If no particular arrangement is made, the rib 331 may be displaced out of the recessed portion 315L. This is why the slanting edge portion 332L is provided in the present invention in such a manner that it serves to return the displaced rib 331 in a direction of arrow b. Such an arrangement can prevent the rib 331 from being displaced out of the recessed portion 315L.

Behavior of the right pivot plate 22R is similar to that of the left pivot plate 22L and thus will not be described to avoid unnecessary duplication.

The following describe a sectional structure of the pivot plates 22.

Figure 27:
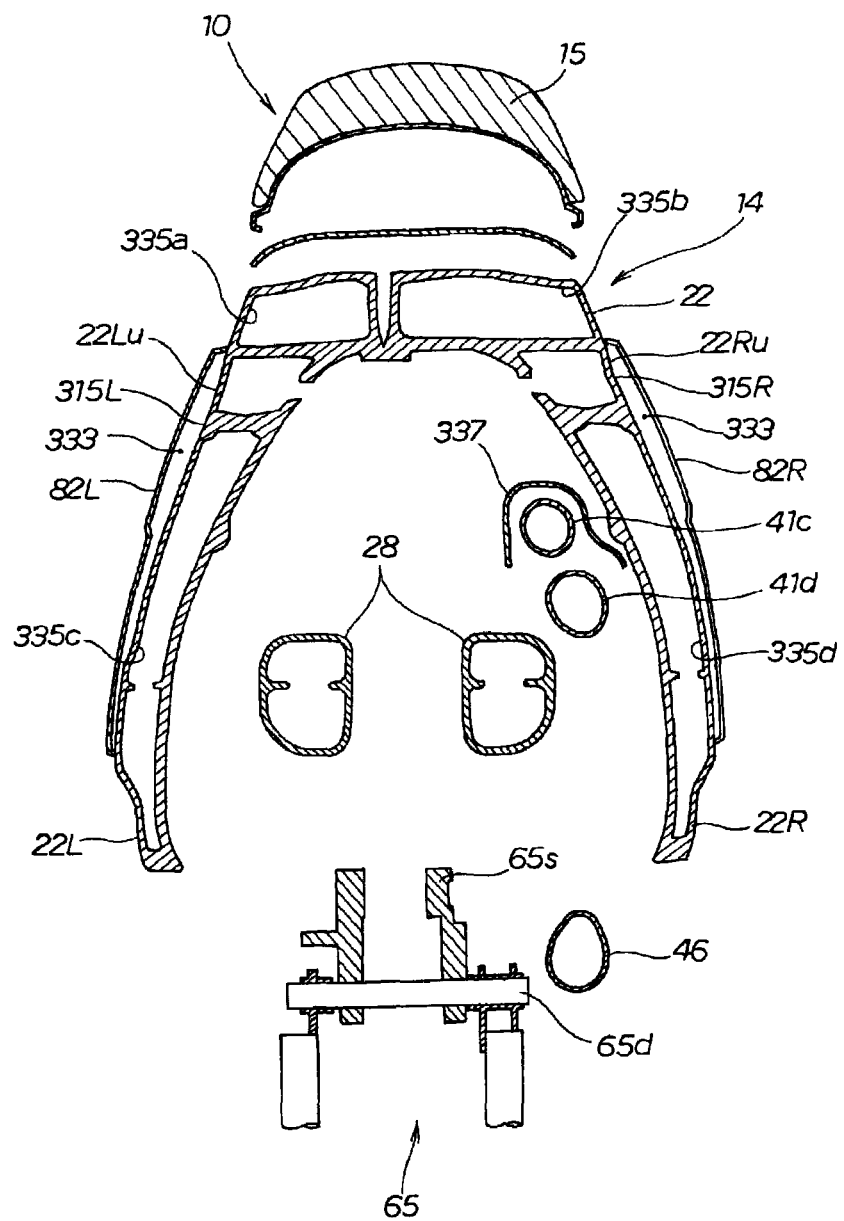
FIG. 27 is a sectional view taken along line 27-27 of FIG. 20.

As shown in FIG. 27, the main stand 65 is supported by a main stand support portion 65s via a main stand shaft portion 65d.

Further, each of the pivot plates 22 is an aluminum cast having a plurality of hollow portions 333a to 335d. Namely, the pivot plate 22 is a so-called hollow structure, and thus, the pivot plate 22 can be reduced in weight while still maintaining necessary rigidity.

The exhaust pipes 41c and 41d are accommodated between the left and right pivot plates 22L and 22R. Although these exhaust pipes 41c and 41d are covered with a first exhaust pipe cover 337, the pivot plates 22L and 22R would increase in temperature due to heat produced from the exhaust pipes 41c and 41d. However, because travel wind passes in the gaps 333 within the pivot plate covers 82L and 82R as set forth above to perform a cooling function, the temperature increase of the pivot plate covers 82L and 82R can be suppressed by the travel wind.

Figure 28:
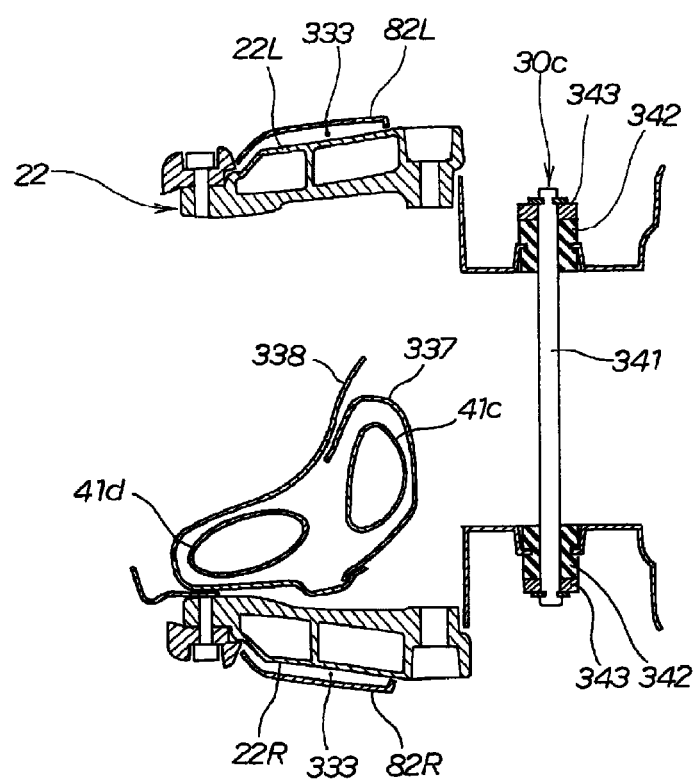
FIG. 28 is a sectional view taken along line 28-28 of FIG. 20.

The following describe in detail the shape of the first exhaust pipe cover 337, with reference to FIG. 28.

As shown in FIG. 28, the left and right rear exhaust pipes 41c and 41d are located inside the right pivot plate 22R and surrounded by the first exhaust pipe cover 337 and a second exhaust pipe cover 338. Because the left and right rear exhaust pipes 41c and 41d are surrounded by the first exhaust pipe cover 337 and second exhaust pipe cover 338, it is possible to reduce an amount of heat transfer from the left and right rear exhaust pipes 41c and 41d to the right pivot plate 22R.

The third support section 30c supporting the engine is located near the first exhaust pipe cover 337. The third support section 30c include: a support shaft 341; shock absorbing members 342 mounted on the support shaft 341 and fitted in the vehicle body frame; and fastener members 343 mounted on the opposite ends of the support shaft 341.

The following describe the rear wheel and structural arrangements provided therearound.

Figure 29:
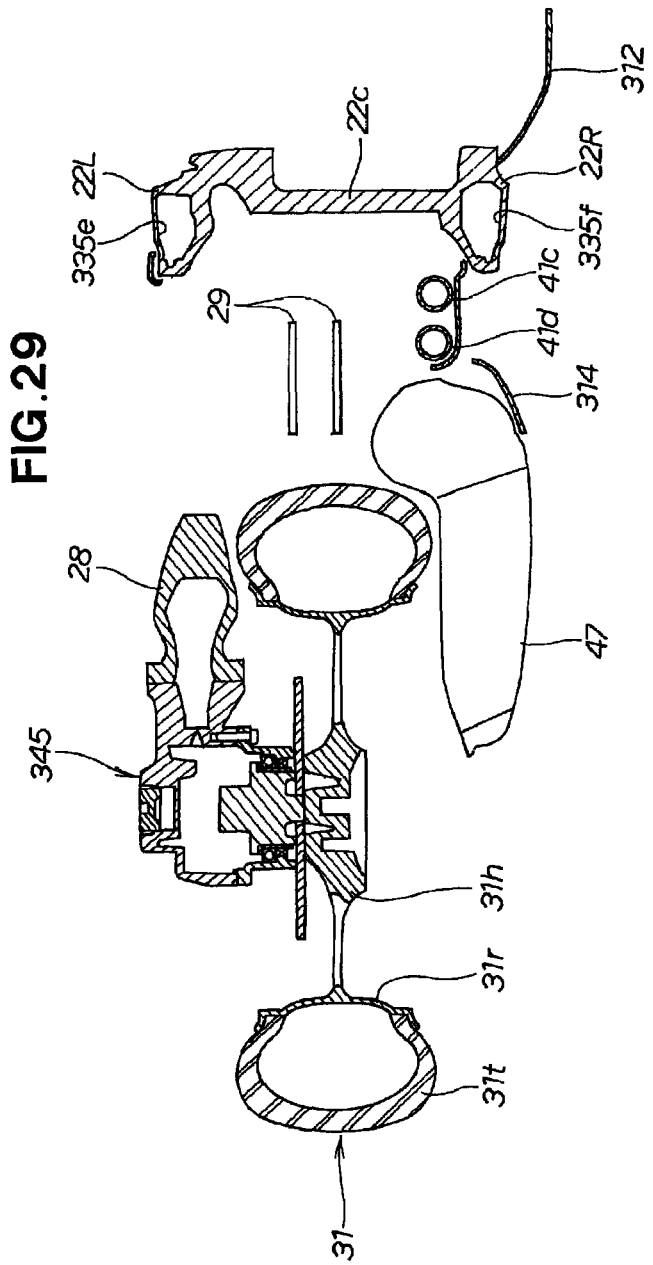
FIG. 29 is a sectional view taken along line 29-29 of FIG. 20.

As shown in FIG. 29, the left and right pivot plates 22L and 22R are interconnected via a connection portion 22c. This connection portion 22c serves to even further enhance the rigidity, in the width direction, of the vehicle.

Figure 30:
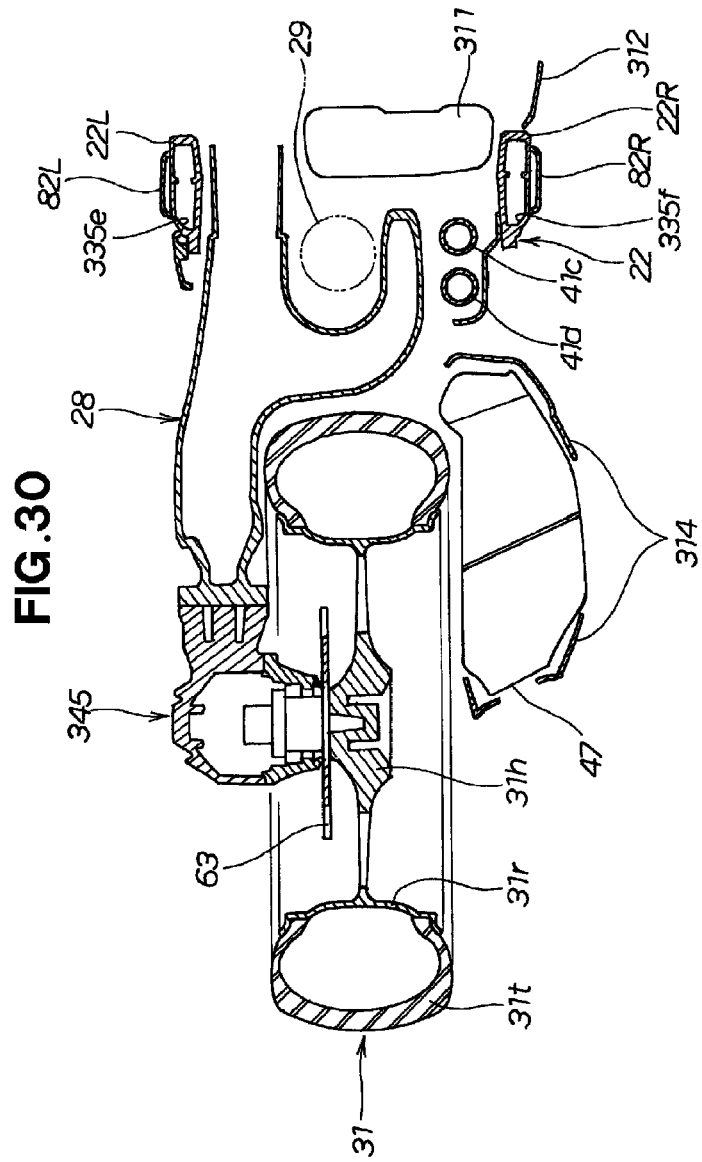
FIG. 30 is a sectional view taken along line 30-30 of FIG. 20.

As shown in FIG. 30, the swing arm 28 is a hollow member, and the drive shaft for transmitting drive force of the engine to the rear wheel is passed through the hollow portion of the swing arm 28.

A gearbox 345 for changing the direction of the drive force is connected to a rear end portion of the swing arm 28, and the rear wheel 31 is rotatably supported by the gearbox 345.

The rear wheel 31 includes a hub 31h, a rim 31r extending around the hub 31h, and a tire attached to the rim 31r. The rear disk plate 63 operable for braking is disposed between the rear wheel 31 and the gearbox 345.

Further, the reservoir tank 311 for storing radiator fluid is disposed inside the left and right pivot plates 22L and 22R and inside the swing arm 28. The reservoir tank 311 is covered with a reservoir tank cover 312.

Figure 31:
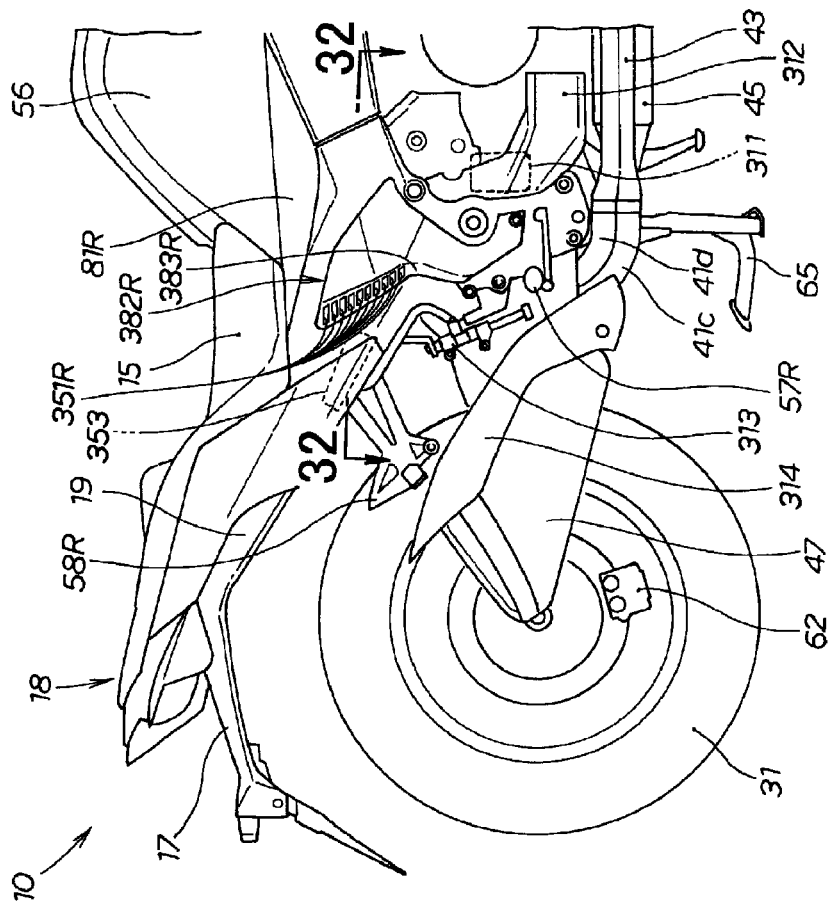
FIG. 31 is a view showing a modification of the construction shown in FIG. 20.

With reference to FIG. 31, the following describe a modification of the construction shown in FIG. 20.

The modification of FIG. 31 is characterized by provision of pivot plate covers 382R and 382L different in construction from the pivot plate covers shown in FIG. 20.

As shown in FIG. 31, the pivot plate cover 382R has a plurality of openings 351R formed in a rear portion 383R thereof in such a manner as to introduce travel wind to inside the vehicle.

Figure 32:
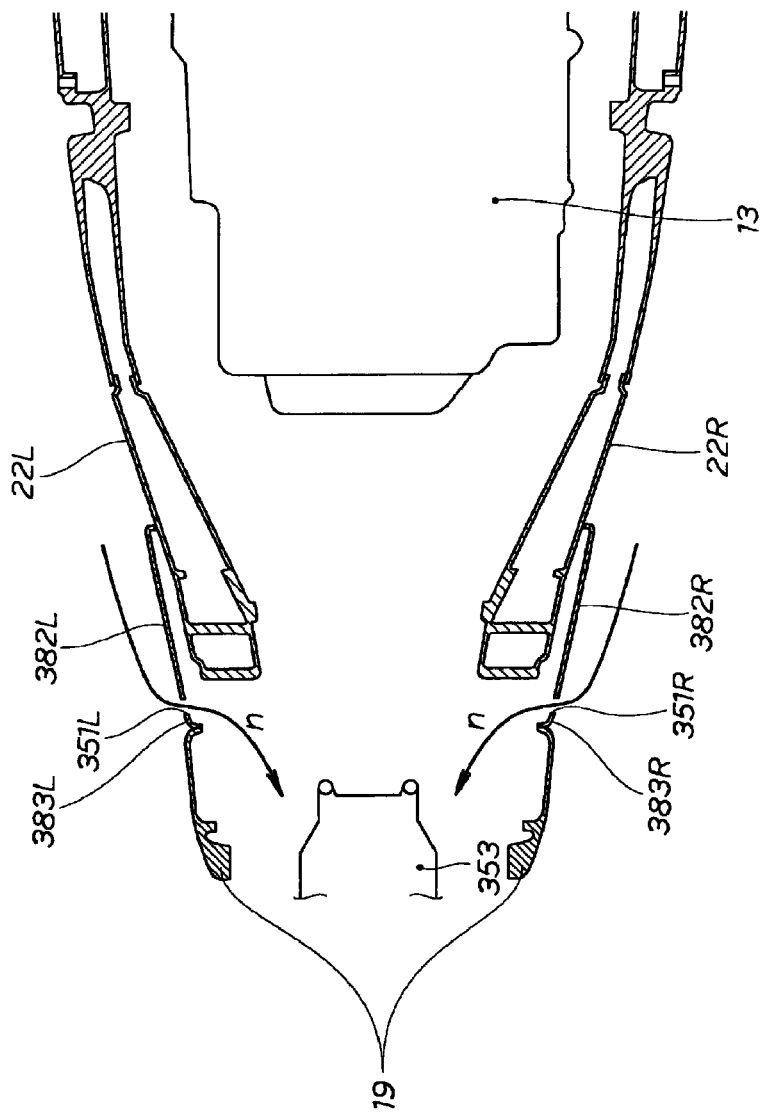
FIG. 32 is a sectional view taken along line 32-32 of FIG. 31.

During travel of the vehicle, as shown in FIG. 32, travel wind gets into the vehicle through the openings 351L and 351R as indicated by arrow n, and flows around a regulator 363 to thereby cool the regulator 353. Thus, it is possible to suppress increase in the temperature of the regulator 353.

Whereas the embodiment has been described above as a two-wheeled motor vehicle, the basic principles of the present invention are also applicable to three-wheeled motor vehicles and other ordinary vehicles.

INDUSTRIAL APPLICABILITY

The basic principles of the present invention are well suited for application to two-wheeled motor vehicles which include a front cowl provided in front of a vehicle body frame, a headlight unit provided within the width, in the vehicle width direction, of the front cowl, and air intake openings provided to the opposite sides of the headlight unit for introducing air from the front of the front cowl to inside the front cowl.

LEGEND 10 vehicle
11 vehicle body frame
59 head light unit
72 front cowl
78L, 78R middle cowls
81L, 81R knee covers
111L, 111R air intake openings
115L, 115R recessed portions
121L, 121R inner cowls
129L, 129R wind directing passages
132Li, 132Ri inlets of air intake ducts
126L, 126R openings
136L, 136R knee cover air inlets
Rf leg of driver

The invention claimed is:
1. A vehicle comprising:
a vehicle body frame;
a front cowl provided in front of the vehicle body frame;
a headlight unit provided within a width, in a vehicle width direction, of the front cowl;
middle cowls provided outside and along opposite side portions of the vehicle body frame for covering opposite side portions of the vehicle;
inner cowls provided inside the middle cowls and extending rearward for covering opposite side portions of the headlight unit;
air intake openings, located on opposite sides of the headlight unit, for introducing air in front of the front cowl to inside the front cowl,
wind directing passages, each provided between one of the middle cowls and one of the inner cowls for directing wind introduced through the air intake openings;
openings provided behind the wind directing passages for directing part of the wind to legs of a driver of the vehicle;
knee covers provided behind the openings for being sandwiched between the legs of the driver and knee cover air inlets provided in front of the knee covers for introducing part of the travel wind to inside the knee covers;
an air cleaner provided behind the wind directing passages; and
air intake ducts extending forward from the air cleaner and having respective inlets facing corresponding outlets of the wind directing passages in such a manner that part of the wind flowing in the wind directing passages can be directed through the air intake ducts to the air cleaner,
wherein the air intake openings are defined by the middle cowls and recessed portions of the headlight formed by causing the opposite sides of the headlight to be concaved inwardly in a vehicle width direction and extend along a vehicle length direction so that a travel wind flows in the vehicle length direction from a forward of the recessed portions to a rear of the air intake openings along the recessed portions.

2. The vehicle of claim 1, wherein layer cowls are provided integrally with and along rear edge portions of the middle cowls, inner layers having the openings fixed to the layer cowls, the inner layers being added with inner walls provided inwardly in the vehicle width direction and extending in the length direction, and a battery is disposed further inwardly in the vehicle width direction and rearwardly of the inner walls, so that part of the wind branched off after having flown past the wind directing passages is directed by the inner walls to the battery.

3. The vehicle of claim 1, wherein an upper side of the headlight unit is positioned immediately above the air intake openings.

4. A vehicle comprising:
a vehicle body frame;
a front cowl provided in front of the vehicle body frame;
a headlight unit provided within a width, in a vehicle width direction, of the front cowl;
middle cowls provided outside and along opposite side portions of the vehicle body frame for covering opposite side portions of the vehicle;
inner cowls provided inside the middle cowls and extending rearward for covering opposite side portions of the headlight unit;
air intake openings, located on opposite sides of the headlight unit, for introducing air in front of the front cowl to inside the front cowl,
wind directing passages, each provided between one of the middle cowls and one of the inner cowls for directing wind introduced through the air intake openings;
openings provided behind the wind directing passages for directing part of the wind to legs of a driver of the vehicle;

an air cleaner provided behind the wind directing passages; and air intake ducts extending forward from the air cleaner and having respective inlets facing corresponding outlets of the wind directing passages in such a manner that part of the wind flowing in the wind directing passages can be directed through the air intake ducts to the air cleaner, wherein the air intake openings are defined by the middle cowls and recessed portions of the headlight formed by causing the opposite sides of the headlight to be concaved inwardly in a vehicle width direction and extend along a vehicle length direction so that a travel wind flows in the vehicle length direction from a forward of the recessed portions to a rear of the air intake openings along the recessed portions, wherein a cowl stay is provided which extends from the vehicle body frame and supports the front cowl, and a meter section is mounted on the cowl stay and has a left side surface and a right side surface, wherein the cowl stay has a left ridge portion formed along a left side thereof and extends along the left side surface of the meter section, and a right ridge portion formed along a right side thereof and extends along the right side surface of the meter section, wherein the left and right ridge portions have a projecting length larger than a thickness of the meter section, and wherein the meter section has a length in the vehicle width direction less than a distance between the left ridge portion and the right ridge portion of the cowl stay, and the meter section is mounted to the cowl stay by being fitted between the left ridge portion and the right ridge portion.

5. A vehicle comprising:

a vehicle body frame;

a front cowl provided in front of the vehicle body frame;

a headlight unit provided within a width, in a vehicle width direction, of the front cowl;

middle cowls provided outside and along opposite side portions of the vehicle body frame for covering opposite side portions of the vehicle;

inner cowls provided inside the middle cowls and extending rearward for covering opposite side portions of the headlight unit;

air intake openings, located on opposite sides of the headlight unit, for introducing air in front of the front cowl to inside the front cowl, wind directing passages, each provided between one of the middle cowls and one of the inner cowls for directing wind introduced through the air intake openings;

openings provided behind the wind directing passages for directing part of the wind to legs of a driver of the vehicle;

an air cleaner provided behind the wind directing passages; and air intake ducts extending forward from the air cleaner and having respective inlets facing corresponding outlets of the wind directing passages in such a manner that part of the wind flowing in the wind directing passages can be directed through the air intake ducts to the air cleaner, wherein the air intake openings are defined by the middle cowls and recessed portions of the headlight formed by causing the opposite sides of the headlight to be concaved inwardly in a vehicle width direction and extend along a vehicle length direction so that a travel wind flows in the vehicle length direction from a forward of the recessed portions to a rear of the air intake openings along the recessed portions, wherein a cowl stay is provided which extends from the vehicle body frame and supports the front cowl, and a meter section is mounted on the cowl stay and has a left side surface and a right side surface, wherein the cowl stay has a left ridge portion formed along a left side thereof and extends along the left side surface of the meter section, and a right ridge portion formed along a right side thereof and extends along the right side surface of the meter section, wherein the cowl stay has a substantially triangular shape with a base located on an upper side thereof and left and right oblique sides located lower than the base, the base being longer than each of the left and right oblique sides, and wherein the meter section has a length in the vehicle width direction less than a distance between the left ridge portion and the right ridge portion of the cowl stay, and the meter section is mounted to the cowl stay by being fitted between the left ridge portion and the right ridge portion.

6. A vehicle comprising:

a vehicle body frame;

a front cowl provided in front of the vehicle body frame;

a headlight unit provided within a width, in a vehicle width direction, of the front cowl;

middle cowls provided outside and along opposite side portions of the vehicle body frame for covering opposite side portions of the vehicle, inner cowls provided inside the middle cowls and extending rearward for covering opposite side portions of the headlight unit;

air intake openings, located on opposite sides of the headlight unit, for introducing air in front of the front cowl to inside the front cowl, wind directing passages, each provided between one of the middle cowls and one of the inner cowls for directing wind introduced through the air intake openings;

openings provided behind the wind directing passages for directing part of the wind to legs of a driver of the vehicle, wherein layer cowls are provided integrally with and along rear edge portions of the middle cowls, inner layers having the openings fixed to the layer cowls, the inner layers being added with inner walls provided inwardly in the vehicle width direction and extending in the length direction, and a battery is disposed further inwardly in the vehicle width direction and rearwardly of the inner walls, so that part of the wind branched off after having flown past the wind directing passages is directed by the inner walls to the battery, an air cleaner provided behind the wind directing passages; and air intake ducts extending forward from the air cleaner and having respective inlets facing corresponding outlets of the wind directing passages in such a manner that part of the wind flowing in the wind directing passages can be directed through the air intake ducts to the air cleaner, wherein the air intake openings are defined by the middle cowls and recessed portions of the headlight formed by causing the opposite sides of the headlight to be concaved inwardly in a vehicle width direction and extend along a vehicle length direction so that a travel wind flows in the vehicle length direction from a forward of the recessed portions to a rear of the air intake openings along the recessed portions.

* * * * *